(12) United States Patent
Jensen et al.

(10) Patent No.: US 12,434,312 B2
(45) Date of Patent: Oct. 7, 2025

(54) METHOD FOR CUTTING A SHELL-TYPE OBJECT, A CUTTER SYSTEM AND A VESSEL EQUIPPED WITH THE CUTTER SYSTEM

(71) Applicant: Advantis A/S, Hinnerup (DK)

(72) Inventors: Kim Dalgaard Jensen, Rønde (DK); Peter Skov Eltzholtz, Højbjerg (KE); Allan Wad Petersen, Horsens (DK); Robert Wojciechowski, Svenstrup J (DK); Søren Madsen, Gedved (DK)

(73) Assignee: Advantis A/S, Hinnerup (DK)

( * ) Notice: Subject to any disclaimer, the term of this patent is extended or adjusted under 35 U.S.C. 154(b) by 106 days.

(21) Appl. No.: 17/802,132

(22) PCT Filed: Feb. 18, 2021

(86) PCT No.: PCT/DK2021/050043
§ 371 (c)(1),
(2) Date: Aug. 24, 2022

(87) PCT Pub. No.: WO2021/170190
PCT Pub. Date: Sep. 2, 2021

(65) Prior Publication Data
US 2023/0078101 A1 Mar. 16, 2023

(30) Foreign Application Priority Data
Feb. 25, 2020 (DK) .............................. 2020 70121

(51) Int. Cl.
B23D 57/00 (2006.01)

(52) U.S. Cl.
CPC ...... *B23D 57/0038* (2013.01); *B23D 57/0023* (2013.01); *B23D 57/0046* (2013.01); *B23D 57/0092* (2013.01)

(58) Field of Classification Search
CPC ............ B23D 59/0038; B23D 57/0023; B23D 57/0046; B23D 57/0092; B23D 57/0084;
(Continued)

(56) References Cited

U.S. PATENT DOCUMENTS 2,641,042 A * 6/1953 Kopp .................... B28B 11/166
100/906
3,734,991 A * 5/1973 Vrijma .................. B28B 11/145
264/157
(Continued)

FOREIGN PATENT DOCUMENTS

CN 109397551 A * 3/2019 ............... B28D 1/08
DE 202015003559 U1 * 8/2015 ......... B23D 57/0007
(Continued)

*Primary Examiner* — Ghassem Alie
(74) *Attorney, Agent, or Firm* — Dykema Gossett PLLC

(57) ABSTRACT

An object of the invention is achieved by a method for cutting an elongated shell-type object. The method may include steps of providing a gantry defining a portal and comprising a wire grid operable in the portal; operating the wire grid, whilst moving the shell-type object through the wire grid along a lateral-axis (Z) substantially perpendicular to the portal. The method is performed by a stationary gantry, where the shell-type object is moved through the portal. Thereby, the method is simplified as there is no need for a rail system for moving the gantry.

12 Claims, 17 Drawing Sheets

(58) Field of Classification Search
CPC ............ B23D 57/0069; B23D 57/0053; B23D 61/185; B28D 1/08; F03D 80/00; F03B 2230/70; Y02E 10/72; Y02P 70/50
USPC ............................................................ 83/13
See application file for complete search history.

(56) References Cited

U.S. PATENT DOCUMENTS

| | | | | |
|---|---|---|---|---|
| 4,955,272 | A * | 9/1990 | Schreuders | B28B 11/145 83/425.2 |
| 5,690,092 | A * | 11/1997 | Ogyu | B28D 1/30 451/6 |
| 6,267,037 | B1 * | 7/2001 | McCoy, Jr. | B23D 57/0084 83/810 |
| 8,065,995 | B2 * | 11/2011 | Bakshi | B28D 5/0076 125/16.02 |
| 2009/0320658 | A1 * | 12/2009 | Yazawa | B23D 57/0038 83/13 |
| 2011/0138983 | A1 * | 6/2011 | Clark, II | F16L 1/207 83/801 |
| 2020/0061725 | A1 * | 2/2020 | Lilly | B23D 57/0053 |
| 2021/0205941 | A1 * | 7/2021 | Karimi Jahromi | B23C 9/00 |

FOREIGN PATENT DOCUMENTS

| | | |
|---|---|---|
| DE | 102015219412 A1 | 4/2017 |
| EP | 0385559 A2 | 9/1990 |
| EP | 1055498 A2 | 11/2000 |
| JP | 2014042982 A | 3/2014 |
| WO | 2005/105353 A1 | 11/2005 |
| WO | 2009/040841 A1 | 4/2009 |
| WO | 2017/194208 A1 | 11/2017 |
| WO | 2019/079823 A1 | 4/2019 |

* cited by examiner

METHOD FOR CUTTING A SHELL-TYPE OBJECT, A CUTTER SYSTEM AND A VESSEL EQUIPPED WITH THE CUTTER SYSTEM

CROSS-REFERENCE TO RELATED APPLICATIONS

This application is a national stage filing based upon International PCT application no. PCT/DK2021/050043, filed 18 Feb. 2021, which claims the benefit of priority to Denmark application no. PA 2020 70121, filed 25 Feb. 2020.

FIELD OF THE INVENTION

The present invention relates to a method for cutting a shell-type object, a cutter system and a vessel equipped with the cutter system.

BACKGROUND OF THE INVENTION

The wind industry is rapidly growing and as a consequence the total number of wind turbine generators is increasing rapidly annually. The size and wing span of wind turbine generators are ever increasing in a pursuit towards higher power generation per wind turbine generator.

The wing span of some wind turbine generators is nearing 200 m. It is well known that the transportation of the individual components of a wind turbine generator is difficult due to the size of the components.

The same problems arise when the wind turbine generator is to be decommissioned at the end of life. In 2030, the annual mass of end-of-life blades is expected to be 400,000 tons and 800,000 tons by 2050.

The blades of a wind turbine generator are basically an elongated hollow shell having a low solid volume and a high gas volume.

In order to avoid transportation of end-of-life blades, it has been proposed to decommission the blades on-site with a shredder. However, the shredder must be extremely large to be able to shred a single component with a diameter of about 4 m and a length of 80 m. The consequence is that the shredder becomes difficult to transport and the complexity increases with the size of the shredder.

WO2019079823 proposes a vehicle-mounted wire saw capable of cutting wind turbine blades along the longitudinal axis. However, the proposed vehicle is moveable on rails, thus to cut a blade of 80 m the system will need 80 meters of rail which must be transported to the site and installed on site. Furthermore, the typical wind turbine generator has three blades and thus either the 80 m of rails must be moved or the blades must be moved to be positioned at the rails. In the prior art, the blades are only sectioned in a longitudinal axis and this will still create issues/complexity in transporting (width and height) the blades, and they must then be processed even further to feed a standard size shredder—the present invention will solve this issue.

Thus, there is a need for a simpler method for cutting an elongated shell-type object, such as a wind turbine blade, into sections.

Likewise, there is a need for simpler and more compact cutter system capable of cutting an elongated shell-type object, such as a wind turbine blade, into sections.

If the resulting sections can be feed a standard shredder, then it will be a significant improvement over the prior art.

OBJECT OF THE INVENTION

It is an object to provide a faster, simpler and more reliable method for cutting a shell-type object.

It is an object to provide a system capable of performing the method, while being more compact compared to the prior art.

DESCRIPTION OF THE INVENTION

An object of the invention is achieved by a method for cutting an elongated shell-type object.

The elongated shell-type object may be a wind turbine blade, which is decommissioned. A wind turbine blade has a low solid (S) volume and a high gas (G) volume and the blade is long typically larger than 50 m. The length and S/G ratio can be reduced by cutting the wind turbine blade into smaller sections as the sections can be stacked or be feed to a standard shredder.

The invention is described several times with a wind turbine blade used as an example for an elongated shell-type object however the invention is not limited to a wind turbine blade.

Other examples of an elongated shell-type object is an aeroplane hull, a vessel hull or a glass fiber reinforced container which all have a size making the transportation of the shell-type object difficult and the objects all have a low solid (S) volume and a high gas (G) volume. Thus, the present invention can improve the ease of decommissioning of the objects. None of the mentioned objects will be able to be feed a standard shredder without preliminary cutting into smaller sections.

Furthermore, the elongated shell-type object may be a tank, a vessel or a pipe provided that the objects have a size making it impossible to feed the mentioned objects to a standard shredder without preliminary cutting into smaller sections.

The method comprises one or more acts as will be described in the following.

There is an act of providing a gantry defining a portal and comprising a wire grid operable in the portal.

The wire grid is adapted for cutting an object moving through the portal.

There is an act of operating the wire grid.

Whilst performing the act of operating, there is an act of moving the shell-type object through the wire grid along a lateral axis (Z) substantially perpendicular to the portal.

In the prior art the portal and wire grid is moved through the shell-type object while cutting, however this causes the shell-type object to behave unstable and it is necessary to support the shell-type object at multiple points along the structure of the shell-type object in order to prevent an unwanted displacement of the shell-type object causing down-time. The present method moves the shell-type object through the portal and wire grid. The act of moving provide a higher level of control, which increases the reliability compared to the prior art.

As a positive added effect, the gantry can be simplified relative to the prior art as the gantry is stationary i.e. there will be no need for rails, breaks or the like.

The effect of moving the shell-type object through the portal and wire grid is compared to the prior art which drives the portal and wire grid through the shell-type object, is that the method become more reliable.

The method is performed by a stationary gantry, where the shell-type object is moved through the portal. Thereby, the method is simplified relative to the prior art as there is no need for a rail system for moving the gantry.

Furthermore, the movement of the shell-type object makes the method more stable as it is possible to correct the position of the shell-type object relative to the gantry while the act of moving is performed.

The shell-type object may be moved by a crane, a truck, a wheel mounted dolly, a rail system or another vehicle or a pull system capable of pulling the shell-type object.

The shell-type object is cut along the lateral axis into sections having a length equal to the shell-type object.

The number of sections and the size of the sections are defined by the wire grid. The wire grid may comprise several cutter wires extending across the portal.

In an embodiment, one or more cutter wires extend substantially along a horizontal axis (X) across the portal.

In an embodiment, one or more cutter wires extend substantially along a vertical axis (Y) across the portal.

The one or more cutter wires will by extending along the vertical axis experience less force on the cutter wire compared to the one or more cutter wires extending substantially along a horizontal axis since the weight of the elongated shell-type object is not pushing down onto the wires.

In an embodiment, the wire grid comprises multiple cutter wires extending across the portal, where a first group of the multiple cutter wires extend substantially along a horizontal axis (X) across the portal and a second group of cutter wires extend substantially along a vertical axis (Y) across the portal. Thereby, the elongated object can be cut into sections with a smaller width measured along the horizontal axis (X) and a smaller height measured along the vertical axis (Y).

In an embodiment, the one or more cutter wires extend along vectors having an X-component and a Y-component.

The one or more cutter wires extending across the portal grid may be a single wire extending across the portal one or more times.

The one or more cutter wires extending across portal grid may be individual wires, which will make it easier to replace a broken wire when only one wire having a relative short length has to be replaced.

Furthermore, the individual cutter wire may in some embodiments be operated individually, the effect of which will be discussed later in the description.

In an embodiment, the act of providing may include providing a bottom support supporting the shell-type object at a proximal point relative to the gantry.

The proximal point may be at the portal and/or on a front side of the gantry, wherein the front side faces the elongated shell-type object to be cut.

The bottom support will increase the stability of the shell-type object during movement.

Furthermore, the bottom support may be configured to lower friction along the lateral axis (Z) for easing the act of moving the shell-type object.

The friction can be lowered by the bottom support having a small contact area with the elongated object.

The bottom support may be one or more elongated rollers having a rotation axis substantially parallel to the horizontal axis. Thereby, the stability is increased and the method can be performed quicker, thus decreasing overall costs.

In an aspect, the act of providing may include providing a bottom support supporting the shell-type object at a proximal point relative to the gantry.

The act of moving the shell-type object may include an act of displacing the shell-type object along a vertical-axis by displacing the bottom support.

A displacement of the bottom support will cause a displacement of the shell-type object. Thus, the combination of the bottom support and the displacement of the bottom support enables the method to divide the shell-type object into shorter sections as the vertical displacement causes the wire grid to cut the shell-type object vertically.

Thereby, a wind turbine blade can be cut into sections having a length of 10 m, 5 m or 3 m, or any other length shorter than the length of the wind turbine blade. The shorter sections can be moved with standard equipment such as a forklift, which is not considerable easier than an entire wind turbine blade in one piece.

The sections may afterwards be fed to a shredder or may be transported to another site for shredding and/or recycling.

The shredded sections may afterwards be stored and transported in a container such as a standard container.

In an aspect, the act of providing may include attaching a fastening system to the shell-type object at a distal point relative to the gantry.

The fastening system may comprise hooks attached to the shell-type object.

The fastening system may comprise a rod extending through the shell-type object, wherein the rod has free ends on both sides of the shell-type object for connection with cables.

The fastening system may comprise a sled comprising a sled support for supporting the elongated object and the sled may be adapted for being pulled by cables.

The act of moving the shell-type object is performed by pulling the fastening system towards the gantry.

This simplifies the method as the fastening system can be pulled by a vehicle or vehicles or a pull system and it is only necessary to attach the fastening system at a distal point relative to the gantry instead of supporting the shell-type object along the entire length.

Thereby, allowing the system performing the method to become even more compact.

The pulling is expected to be more reliable compared to pushing the shell-type object through the portal.

The efficiency and reliability of the method is increased significantly if the fastening system is combined with the bottom support as this creates support points or control points in both ends of the shell-type object.

In an aspect the act of providing may include providing a pull system comprising one or more cables connected to the fastening system.

The act of moving the shell-type object is performed by pulling the one or more cables as a function of the position of the distal point of the shell-type object.

Thereby, the reliability of the method is increased as moving the shell-type object as a function of the position of the distal point ensures that the shell-type object moves correctly through the portal without engaging the gantry.

In an embodiment, the pull system comprises cables on opposite sides of the gantry, and thereby the method is able to correct the movement in a plane defined by the lateral axis (Z) and the horizontal axis (X).

In an aspect, the method may further comprise acts of determining a strain on the wire grid.

The strain on the wire grid may be determined by measuring a power consumption or flow of a wire drive driving the one or more cutter wires.

The gantry may comprise a tension system being a set of pivotable arms adapted for applying a tension force to the one or more cutter wires for removal of slack. If a cutter wire experiences a large force due to movement of the elongated object, then the pivotable arm connected to the wire cutter will move to a different angle. Thus, the strain may be determined by the angle of the pivotable arms.

The strain on the wire grid may be determined by measuring a power consumption or flow of a wire drive driving the one or more cutter wires.

The act of moving the shell-type object is performed as a function of the strain and/or the act of operating the wire grid is performed as a function of the strain.

If the strain exceeds a threshold value, then the cutter wire may break resulting in unwanted downtime, thus the moving as a function of the strain and/or operating the wire grid as a function of the strain decreases the risk of exceeding the threshold value.

Furthermore, since the strain is continuously determined, the method can be performed while having a strain on the wire grid which is closer to the threshold value. Thereby, the speed of operation can be increased.

In an embodiment, the gantry comprises a wire drive for each of the wires enabling an individual control of each of the cutter wires, this increases complexity, but it increases control even further.

In an embodiment, the act of providing may include one or more side supports on one or both sides of the portal, and the act of moving the shell-type object may include an act of displacing the shell-type object along a horizontal-axis perpendicular to the lateral-axis.

Thereby, the one or more side supports ensure to correct the movement of the shell-type object such that the object does not hit or engage the gantry, but only moves through the portal and thus the wire grid. This will increase reliability of the method as the risk of downtime is decreased.

In an embodiment, the act of providing the wire grid includes two or more cutter wires and the act of operating the wire grid is performed by operating the two or more cutter wires individually.

Depending on the type of shell-type object, the wires may cut into different materials or different thickness of materials causing each wire to experience different strains. This can be counteracted by the one or more cutter wires being operated individually.

In an aspect, the act of providing may be an act of providing the gantry as an assembly kit in a container and the act of providing includes an act of assembling the gantry.

Thereby, the gantry can easily be transported to the site of the part to be decommissioned and cut it into sections.

As an example the gantry can be transported to the site of a wind turbine generator, where the blades are lying on the ground.

The gantry can be assembled at the end of a blade and the blade may afterwards be moved through the portal of the gantry.

The gantry may then be moved to the next blade and the act of moving is repeated.

If the cutter system includes one or more sleds, then the sleds may be sent before the gantry such that the three blades of the wind turbine generator are positioned with a sled supporting each of the blades.

The pull system may then be connected to one of the sleds and the act of moving the blade is performed by pulling the sled and thus the blade towards the gantry.

An object of the invention is achieved by a method for cutting multiple elongated shell-type objects aligned side by side and in parallel.

The method comprises acts of cutting one shell-type object. The act of cutting may be performed as described in one or more of the embodiments described previously.

After cutting one shell-type object, then an act of translocating the gantry along a horizontal axis perpendicular to the multiple shell-type objects is performed, wherein the act of cutting can be repeated.

The method performs an act of repeating the act of cutting and translocating until all shell-type objects are cut.

The gantry will always weigh less and have a smaller volume than the shell-type objects since the shell-type objects are large objects such as wind turbine blades, aeroplanes hulls or the like.

The typical wind turbine generator has three blades. The blades may be aligned side by side in parallel. The gantry is then positioned at an end of the first blade, which is cut as previously described. This is followed by moving the gantry to an end of the second blade followed by the method of cutting and so on.

Thereby, the method can be performed faster as the gantry is moved instead of the large blade and there is no need for a railway, so the gantry is ready to perform the method for cutting when the gantry is positioned at an end of the blade.

An object of the invention is achieved by a cutter system for cutting an elongated shell-type object such as a wind turbine blade, the cutter system comprising means for performing the method for cutting an elongated shell-type object.

An object of the invention is achieved by a cutter system configured for cutting an elongated shell-type object.

The cutter system may comprise a gantry defining a portal, the gantry having a front side for facing the elongated shell-type object.

The cutter system may comprise one or more cutter wires. The one or more cutter wires extend in the portal, thereby defining a wire grid.

The cutter system comprises a controller.

The controller operates operating a wire-drive configured for driving the one or more cutter wires.

The cutter system comprises moving means for moving the shell-type object through the portal.

The cutter system is able to cut elongated shell-type objects such as wind turbine blades into elongated sections. The moving means move the shell-type object through the portal while the gantry is stationary. Thereby, the gantry can be made more compact as there is no need for rails for the gantry to move. Furthermore, the movement of the shell-type object makes the cutter system more reliable as the position of the shell-type object can be corrected during cutting, if needed.

The shell-type object may be moved by a crane, truck, wheel mounted dolly, rail system, or another vehicle or system capable of moving the shell-type object.

The shell-type object is to be moved substantially along a lateral axis (Z), the lateral axis being perpendicular to the portal.

In an embodiment, the cutter system may further comprise a bottom support positioned at the portal and/or near the front side of the gantry for supporting the shell-type object at a proximal point relative to the gantry.

The bottom support stabilizes the shell-type object during movement.

The bottom support may be adapted for reducing friction between the bottom support and the shell-type object along the lateral axis, thereby enabling the shell-type object to be moved faster, thereby increasing speed of operation.

The bottom support may be one or more bottom rollers extending along a horizontal axis (X) perpendicular to the lateral axis (Z). The rollers will further decrease friction.

The cutter system further comprising means for making the gantry stationary.

The means may be guy lines extending from the gantry to multiple ground screws screwed into the ground.

If the gantry is placed on a vessel, then the vessel may have attachment points to which the gantry can be connected.

The wire cutters may be continuously abrasive wires.

The wire cutters may be mounted with diamond coated beads, i.e. utilizing diamond wire cutting (DWC) technology.

The gantry may comprise a first and second pillar and a cross bar extending between the pillars, and thereby the gantry defines the portal. The pillars are adapted for enabling the one or more cutter wires to extend across the portal thereby forming the wire grid.

In an aspect, the cutter system may further comprise a bottom support positioned at the portal and/or near the front side of the gantry for supporting the shell-type object at a proximal point relative to the gantry, wherein the bottom support being configured to be displaceable along a vertical axis.

The bottom support may be configured to be displaceable along a vertical axis by one or more actuators connected to the bottom support for displacing the bottom support along the vertical axis (Y).

Thereby, the cutter system can cut the shell-type object into sections having a length which is shorter than the total length of the shell-type object, because the shell-type object will also be displaced causing the wire cutters to cut the shell-type object vertically.

This will make it considerably easier to move the sections after cutting, since the section may cut into sections having a length such that the sections can be moved by a forklift and thereby be fed to shredder or to a container.

In an embodiment, the cutter system may further comprise one or more side supports on one or both sides of the portal; the side supports being configured to guide the shell-type object.

The one or more side supports may be positioned on the front side of the gantry to control the feeding of the shell-type object into the portal.

The one or more side supports may be displaceable along the horizontal axis (X) by one or more actuators.

The one or more side supports may be rollers having a rotation axis substantially parallel to the vertical axis (Y).

Thereby, the cutter system becomes more reliable as there is a reduced risk of the shell-type object colliding with the gantry.

In an embodiment, the moving means may comprise a sled for supporting and guiding the object at a distal point relative to the gantry, the sled being configured to be moveable.

The sled may be one of the two different embodiments disclosed in FIG. 10C and FIG. 11.

The sled excels by being simple and cheap, thus if a wind turbine generator is to be decommissioned. Then each blade of the wind turbine generator can at one end be placed and supported by a sled. Afterwards, the gantry can be placed at the other end of the blade.

If the gantry comprises a bottom support, then it will be advantageous to support the blade at a proximal point relative to the gantry.

Thereafter, a pull system can be used to pull the blade towards and through the portal. Thereby, the blade is cut into sections. The bottom support can advantageously be used to displace the blade along a vertical axis (Y) for making a vertical cut, thereby shortening the sections significantly.

In an embodiment, the sled may comprise a sled base being adapted for being pulled over a ground surface. The ground surface may be grass or earth. The ground surface may be steel or a metal if the sled is to be positioned on a vessel. Thus, the sled may have different bases based on the ground surface, the skilled person would know how to modify or adapt the sled base to different types of ground surfaces.

The sled may comprise a sled support adapted for supporting the shell-type object. The sled support may comprise a centre support valley having a trough for creating a large surface area engaging the shell-type object, thereby increasing friction between the sled support and the shell-type object. This enables the sled to be pulled with a larger force, i.e. a higher speed thereby increasing speed of operation.

In an embodiment the trough may be at a higher point on the vertical axis than the bottom support. Thereby the shell-type object will become slightly tilted relative to the lateral axis (Z), which increases the stability of the operation. Furthermore, it will increase the friction between the sled support and the shell-type object.

In an embodiment, the sled may comprise a sled base, two pairs of sled arms pivotally connected to the sled base, each pair being interconnected by a sled bar extending between the sled arms, wherein a sled support extends between the two sled bars. The sled support is a flexible support such as a softsling or a chain.

The sled arms are equipped with a plurality of sled jaws. The sled jaws are positioned on the sled arms facing substantially the opposite sled arms.

The sled jaws are adapted for increasing the friction between the sled and the shell-type object. The friction can be increased by choosing a suitable material which has a high friction coefficient with the material of the shell-type object.

The sled jaws may be saw-toothed to increase friction further.

The pivotal arms will when a shell-type object is positioned and supported by the sled support pivot towards each other thereby gripping the shell type object with the sled jaws.

In an aspect, the moving means may comprise a fastening system for attaching to the shell-type object at a distal point relative to the gantry.

The fastening system may be the embodiments of the sled as previously mentioned and the sled may be adapted for being pulled by cables.

The fastening system may comprise hooks attached to the shell-type object. The hooks are then attached to the pull system by the pull cables.

The fastening system may comprise a rod extending through the shell-type object, wherein the rod has free ends on both sides of the shell-type object for connection with cables.

The moving means may further comprise a pull system comprising one or more pull cables connected to the fastening system.

The entire operation is easier to control by pulling the shell-type object through the portal compared to pushing the shell-type object. Thus, the above mention features increase the reliability of the cutter system.

The pull system will preferably be connected to opposite sides of shell-type object, wherein the pull extends to opposite sides of the portal. Thereby the pulling of the object can be controlled more easily as the pulling can be corrected by pulling more at one side compared to the other side.

The pull system may comprise vehicles pulling the one or more pull cables.

The pull system may preferably be one or more winches pulling the one or pull cables.

The winches enable further control over the pulling compared to vehicles as the winches are smaller units which can be controlled by a controller.

In an embodiment a winch is connected to the gantry on both sides of the portal. Thereby, the cutter system can be made more compact compared to the prior art, since all parts of the cutter system is connected to the gantry with the exception of the fastening system, which is to be connected to a distal point of the shell-type object relative to the gantry.

In an aspect, the moving means may be operated by the controller, and the controller being configured for determining a strain on the one or more cutter wires, and the moving means is operated as a function of the strain.

The strain on the wire grid may be determined by measuring a power consumption and/or flow of a wire-drive driving the one or more cutter wires.

The gantry may comprise a tension system being a set of pivotable arms adapted for applying a tension force to the one or more cutter wires for removal of slack. If a cutter wire experiences a large force due to movement of the elongated object, then the pivotable arm connected to the wire cutter will move to a different angle. Thus, the strain may be determined by the angle of the pivotable arms.

Since the cutter wires will break if the strain exceeds a threshold value, the controller enables the system to be more reliable and prevents downtime due to breakage of wire.

The strain on the wire grid may be determined by measuring a power consumption of the one or more winches and/or flow of the one or more winches pulling the shell-type object.

Furthermore, since the strain is continuously determined, the method can be performed while having a strain on the wire grid which is closer to the threshold value. Thereby, the speed of operation can be increased.

The operation of the one or more cutter wires may likewise be operated as a function of the strain as it may sometimes be necessary to increase or decrease the speed of the cutter wires.

The operation of the one or more winches pulling the shell-type object may be operated as a function of the strain.

In an embodiment, the cutter wires are individually controllable and the controller may be configured to operate the cutter wires individually. The shell-type object may along the structure comprise different materials having different strengths and this can be counteracted by the cutter wires being individually controlled.

In an embodiment, the cutter system may comprise one or more cameras and/or one or more sensors for continuously determining the position of the distal point of the shell-type object, the one or more cameras and/or the one or more sensors being in communication with the controller. Thereby, the controller can continuously adjust the movement of the shell-type object.

In an embodiment, the controller may be configured to adjust the positioning of the bottom support and/or the side supports as a function of the shape of the object.

In an embodiment, the one of the one, two or more cutter wires extends across the portal substantially along the horizontal axis (X) and/or the vertical axis (Y).

The one or more cutter wires will by extending along the vertical axis experience less force on the cutter wire compared to the one or more cutter wires extending substantially along a horizontal axis, since the weight of the elongated shell-type object is not pushing down onto the wire.

In an embodiment, the wire grid comprises multiple cutter wires extending across the portal, where a first group of the multiple cutter wires extends substantially along a horizontal axis (X) across the portal and a second group of cutter wires extends substantially along a vertical axis (Y) across the portal. Thereby, the elongated object can be cut into sections with a smaller width measured along the horizontal axis (X) and a smaller height measured along the vertical axis (Y).

In an embodiment, the one or more cutter wires extend along vectors having an X-component and a Y-component.

The one, two or more cutter wires may be endless wires extending along wire paths defined by pulleys along the gantry. An embodiment of the wire paths is described in FIG. 7.

The one, two or more cutter wires may extend across the portal in a direction defined by the relative positioning of an entry pulley and an exit pulley.

If the entry pulley and the exit pulley are at the same vertical height along the vertical axis (Y), then the cutter wire extends along the horizontal axis (X).

If the entry pulley and the exit pulley are at the same horizontal position along the horizontal axis (X), then the cutter wire extends along the vertical axis (Y).

An example of an entry pulley and exit pulley is disclosed in FIG. 7 and FIG. 8.

In an embodiment, the entry pulley and the exit pulley are displaceable along the gantry. Thereby the distance between the wires can be adjusted to performing a specific shell-type object.

As an example, the shell-type object in FIG. 1 have an internal crossbar, it would be undesirable to have a cutter wire to cut along the internal crossbar as it will reduce speed of operation and increase wear on said cutter wire. This can be prevented by choosing a suitable position of the entry pulleys and the exit pulleys.

This could also be solved by displacing the shell-object by displacing the bottom roller and/or the side supports.

In an embodiment, the gantry may extend from a base plate, the base plate being equipped with a set of fork apertures for enabling a forklift to be able to move the gantry in an easy manner.

Even though the gantry is moveable with a forklift, then the gantry is still viewed as being stationary as the gantry is stationary during the intended use i.e. cutting of a shell-type object.

In an aspect, an assembly kit may comprise a bottom plate with hinges.

The assembly kit may comprise two pillars, wherein each pillar having an extending top bar, thereby defining an L-shape.

Each top bar is configured for engaging the top bar of the other pillar.

Each pillar having opposite to the top bar a bottom base configured for engaging the hinges, thereby enabling each pillar to be pivotable between a horizontal position and a vertical position where the top bars engage.

The assembly kit being configured to be assembled into the gantry.

The gantry may further be equipped with previously mentioned technical features of the cutter system.

This design enables the assembly kit and thus the gantry to be transported in a standard container such as a HQ shipping container 20". This enables the assembly kit, the gantry and thus the cutter system to be transported to any site using standard equipment, which will lower transport costs significantly.

Furthermore, the gantry can be assembled using a forklift and optionally winches for raising the pillars.

The base plate may be equipped with a set of fork apertures for enabling a forklift to be able to move the gantry in an easy manner.

In an aspect, the assembly kit may be packed in a container.

Thereby, the gantry and thus cutter system can be transported easily to the site of the decommissioning of the shell-type object.

An object of the invention is achieved by an offshore vessel equipped with the cutter system.

There is an increasing use for decommissioning of off-shore wind turbine generators, and a vessel equipped with the cutter system will be able to cut the parts (e.g. wind turbine blades, tower sections or other wind turbine components) of the off-shore wind turbine generators into smaller sections on-site.

These smaller sections may afterwards be fed to a standard shredder.

Thereby, the wind turbine generator having a low solid-to-gas ratio is by the abovementioned steps decommissioned into shredded parts which can be transported with a high solid-to-gas ratio.

An object of the invention is achieved by a computer program product comprising instructions to cause the cutter system according to one or more of claims 8-14 to execute the steps of the method according to one or more of claims 1-7.

An object of the invention is achieved by a computer-readable medium having stored thereon the computer program.

DESCRIPTION OF THE DRAWING

Embodiments of the invention will be described in the figures, whereon.

DETAILED DESCRIPTION OF THE INVENTION

| Item | No |
|---|---|
| Shell-type object | 10 |
| Proximal point | 12 |
| Distal point | 14 |
| Section | 16 |
| Cutter system | 100 |
| Gantry | 110 |
| Portal | 112 |
| Front side | 114 |
| Wire drive | 120 |
| Wire grid | 122 |
| Cutter wire | 124 |
| Tension arm | 126 |
| Bottom support | 140 |
| Actuator | 142 |
| Side support | 145 |
| Roller | 148 |
| Controller | 160 |
| Guy lines | 170 |
| Ground screws | 172 |
| Moving means | 190 |
| Fastening system | 200 |
| Sled | 210 |
| Sled base | 212 |
| Sled arm | 214 |
| Sled bar | 215 |
| Sled pivot point | 216 |
| Sled jaws | 218 |
| Sled support | 220 |
| Pull system | 300 |
| Winches | 310 |
| Cables | 320 |
| Pulley block | 400 |
| Entry block | 402 |
| Exit block | 404 |
| Direction pulleys | 410X, 410Y |
| Force pulleys | 420Y, 420Z |
| Pinion | 430 |
| Guide wheels | 440 |
| Assembly kit | 500 |
| Bottom plate | 510 |
| Forklift pockets | 512 |
| Hinges | 514 |
| Pillar | 520 |
| Top bar | 522 |
| Bottom base | 524 |
| Vertical position | 550 |
| Horizontal position | 560 |
| Horizontal axis | X |
| Vertical axis | Y |
| Lateral axis | Z |
| Offshore vessel | 800 |
| Container/20" HQ Shipping Container | 900 |
| Method for cutting | 1000 |
| Providing | 1100 |
| Attaching | 1110 |
| Operating | 1200 |
| Moving | 1300 |
| Displacing | 1310 |
| Pulling | 1320 |
| Determining | 1400 |
| Assembling | 1500 |
| Method for cutting multiple elongated shell-type objects | 2000 |
| Translocating | 2100 |
| Repeating | 2200 |

Figure 1:
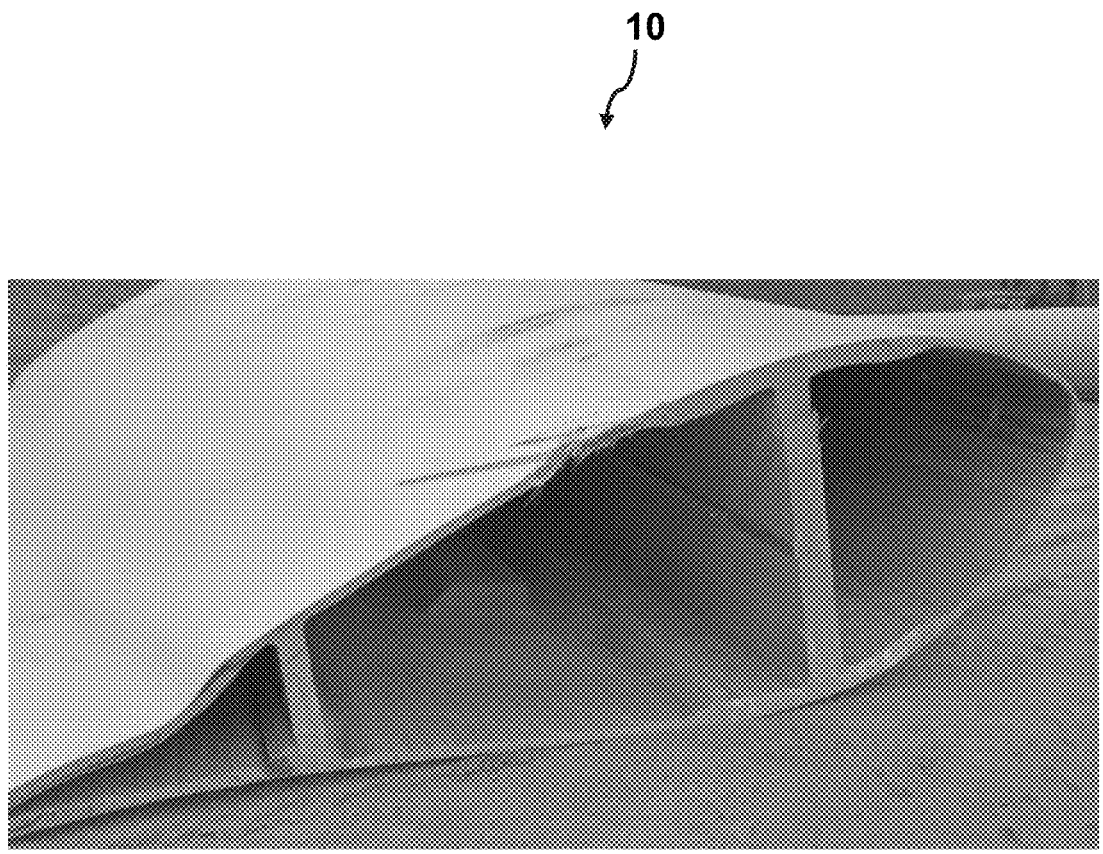
FIG. 1 illustrates an example of an elongated shell-type object.

FIG. 1 illustrates an example of an elongated shell-type object 10. The figure discloses a picture of wind turbine blade section. The blade is clearly a shell-type object 10 as the blade has a low solid volume and a high gas volume, i.e. a low solid-to-gas S/G-ratio.

The blade may be 80 m long, thereby making the transportation of the blade cumbersome and since it is to be decommissioned it will be preferred if the blade can easily be cut into sections having a lower S/G-ratio.

It is especially preferred if the blade can be cut into sections which can be fed to a standard shredder, such that the S/G-ratio is maximized.

Figure 2:
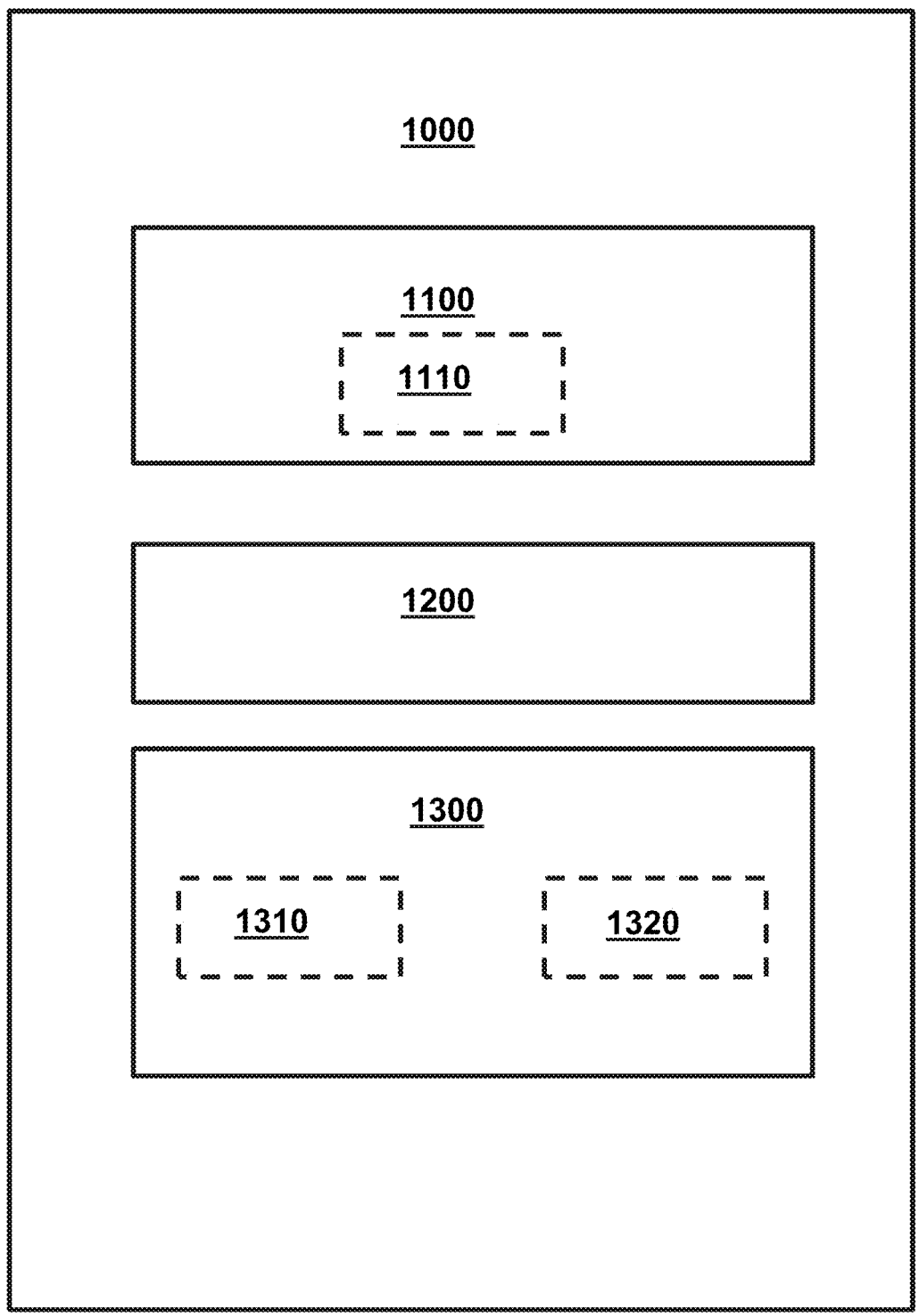
FIG. 2 illustrates a method for cutting an elongated shell-type object.

FIG. 2 illustrates a method 1000 for cutting an elongated shell-type object.

The method for cutting 1000 an elongated shell-type object 10, the method 1000 comprising an act of providing 1100 a gantry 110 defining a portal 112 and comprising a wire grid 122 operable in the portal 112.

The method 1000 comprising an act of operating 1200 the wire grid 122.

The method 1000 comprising whilst performing the act of operating 1200 an act of moving 1300 the shell-type object 10 through the wire grid 122 along a lateral axis Z substantially perpendicular to the portal 112.

The method 1000 may be modified by modifying the act of providing 1100 to include providing a bottom support 140 supporting the shell-type object 10 at a proximal point 12 relative to the gantry 110.

The act of moving 1300 the shell-type object 10 includes an act of displacing 1310 the shell-type object 10 along a vertical axis Y by displacing the bottom support 140.

The method 1000 may be modified by modifying the act of providing 1100 to include attaching 1110 a fastening system 200 to the shell-type object 10 at a distal point 14 relative to the gantry 110.

The act of moving 1300 the shell-type object 10 is performed by pulling 1320 the fastening system 200 towards the gantry 110.

The method 1000 may be modified by modifying the act of providing 1100 to include providing a pull system 300 comprising one or more cables 320 connected to the fastening system 200.

The act of moving 1300 the shell-type object 10 is performed by pulling 1320 the one or more cables 320 as a function of the position of a distal point 14 of the shell-type object 10. The distal point 14 being a distal point relative to the position of the gantry.

The method 1000 may further comprise acts of determining 1400 a strain on the wire grid 122.

The act of moving 1300 the shell-type object 10 is performed as a function of the strain.

The act of operating 1200 the wire grid 122 is performed as a function of the strain.

The act of moving 1300 the shell-type object 10 is performed as a function of the strain and the act of operating 1200 the wire grid 122 is performed as a function of the strain.

The method 1000 may be modified by the act of providing 1100 the gantry 10 as an assembly kit 170 in a container 900 and includes an act of assembling 1500 the gantry 10.

Figure 3:
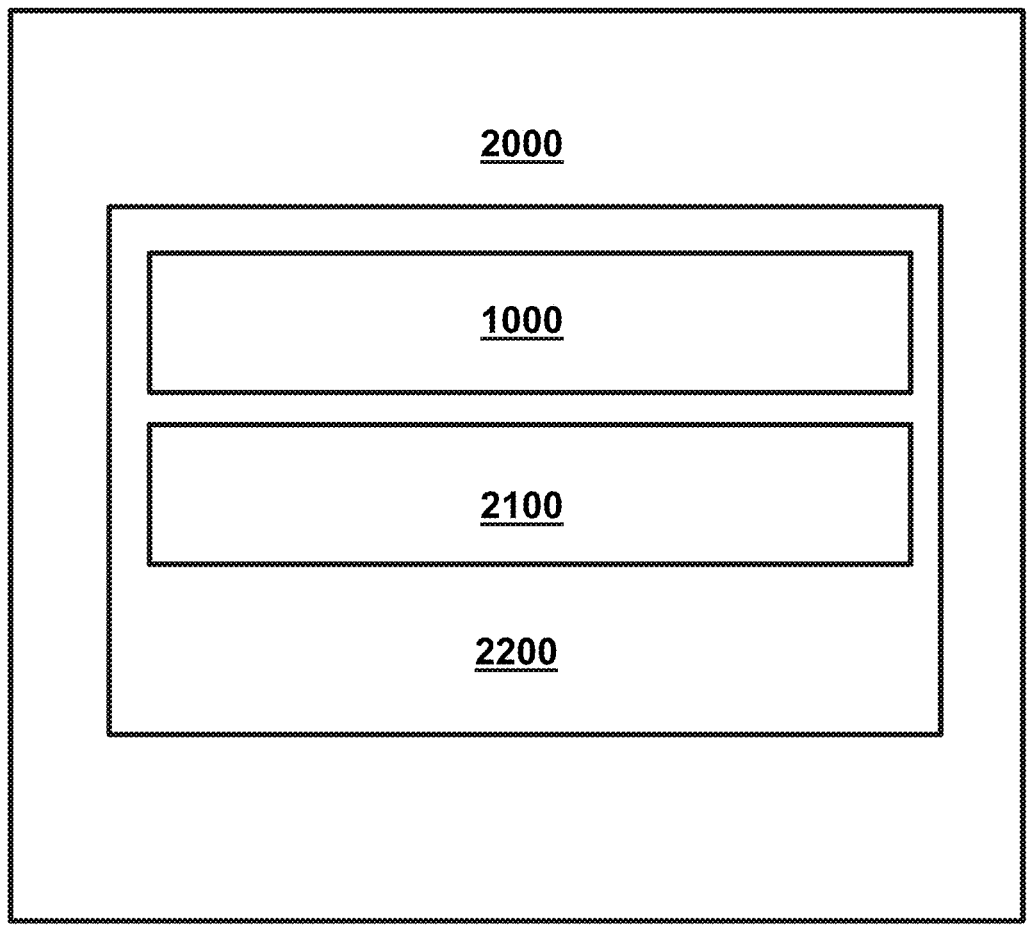
FIG. 3 illustrates a method for cutting multiple elongated shell-type objects aligned side by side and in parallel.

FIG. 3 illustrates a method 2000 for cutting multiple elongated shell-type objects 10 aligned side by side and in parallel.

The method 2000 comprises acts of cutting 1000 one shell-type object 10 according to the method described in FIG. 2 and the corresponding figure description.

This may be followed by translocating 2100 the gantry 110 along a horizontal axis X perpendicular to the multiple shell-type objects 10.

The act of cutting 1000 is then repeated for the next shell-type object 10 in-line.

The method 2000 comprises an act of repeating 2200 the act of cutting 1000 and translocating 2100 the multiple elongated shell-type objects 10 are cut.

Figure 4:
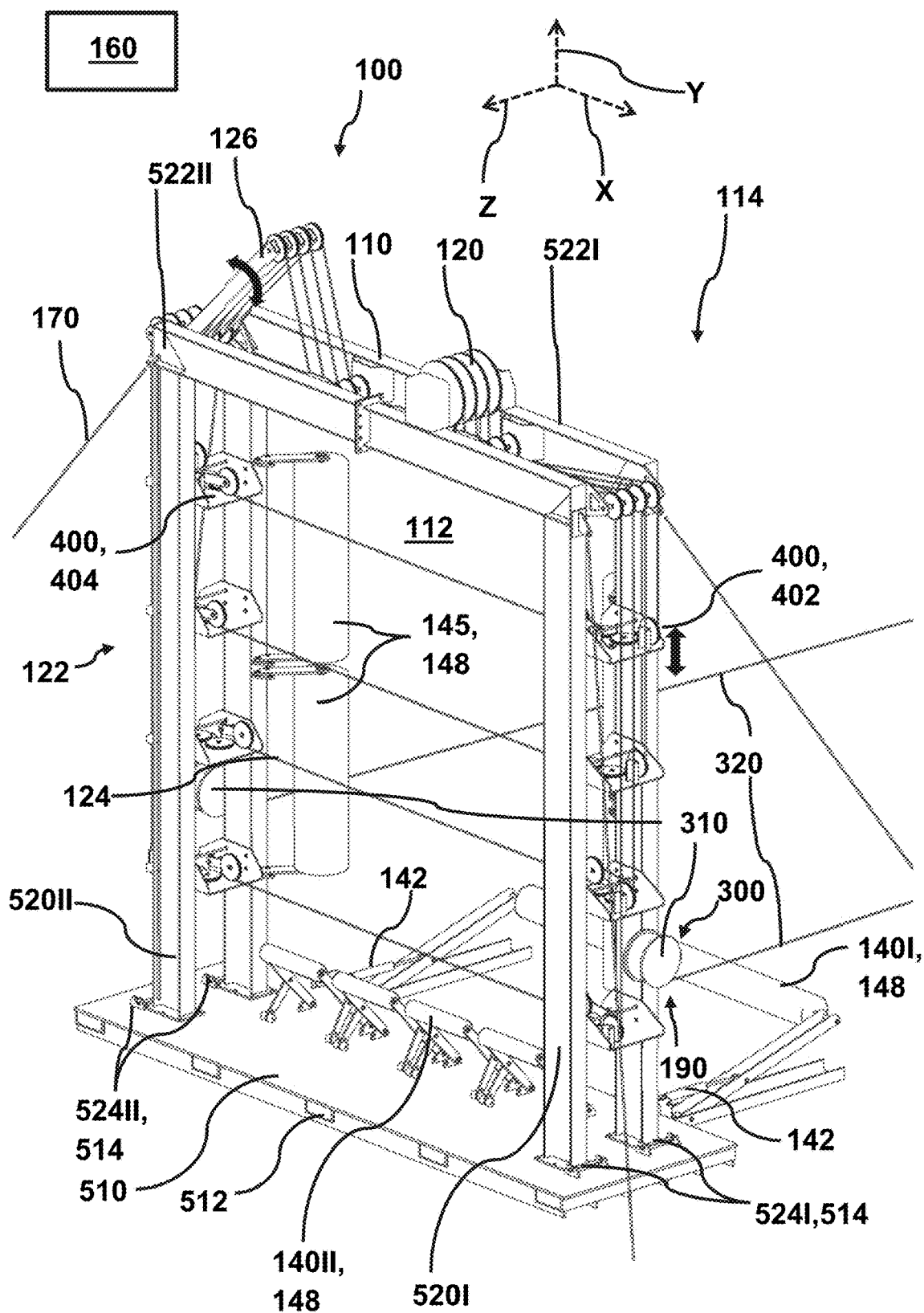
FIG. 4 illustrates a cutter system.

FIG. 4 illustrates a cutter system 100. The cutter system 100 is configured for cutting an elongated shell-type object 10.

The cutter system 100 comprises a gantry 110 defining a portal 112, the gantry 110 having a front side 114 for facing the elongated shell-type object 10.

The portal 112 is substantially in a plane defined by a horizontal axis X and a vertical axis Y. The portal 112 is substantially perpendicular to a lateral axis Z along which the shell-type object 10 is to be moved.

The gantry 110 comprises two pillars 520I, 520II, wherein each pillar 520I, 520II has an extending top bar 522I, 522II, thereby defining an L-shape. Each top bar 522I, 522II is configured for engaging the top bar 522II, 522I of the other pillar 520II, 520II. Each pillar 520 has opposite to the top bar 522I, 522II a bottom base 524I, 524II.

The cutter system 100 comprises a bottom plate 510 for stabilising the cutter system 100. The bottom base 510 comprises hinges 524 being complementary to the bottom bases 524I, 524II, thereby allowing the L-shaped pillars 520I, 520II to make a pivot movement in the shown XY-plane such that the two top bars 522II, 522I engage. The two top bars 522II, 522I may be further secured using bolts, the skilled person would know how. This movement is disclosed in greater detail in FIG. 15.

The bottom base 510 further comprises forklift pockets 512, thereby enabling the cutter system to be moved using a forklift. This enables the cutter system 100 to be moved by simply means to an end of the elongated shell-type object.

The gantry 110 has on each pillar 520I, 520II four pulley blocks 400, where one pillar 520I has four entry blocks 402 and the other pillar 520II has four exit blocks 404.

Figure 8:
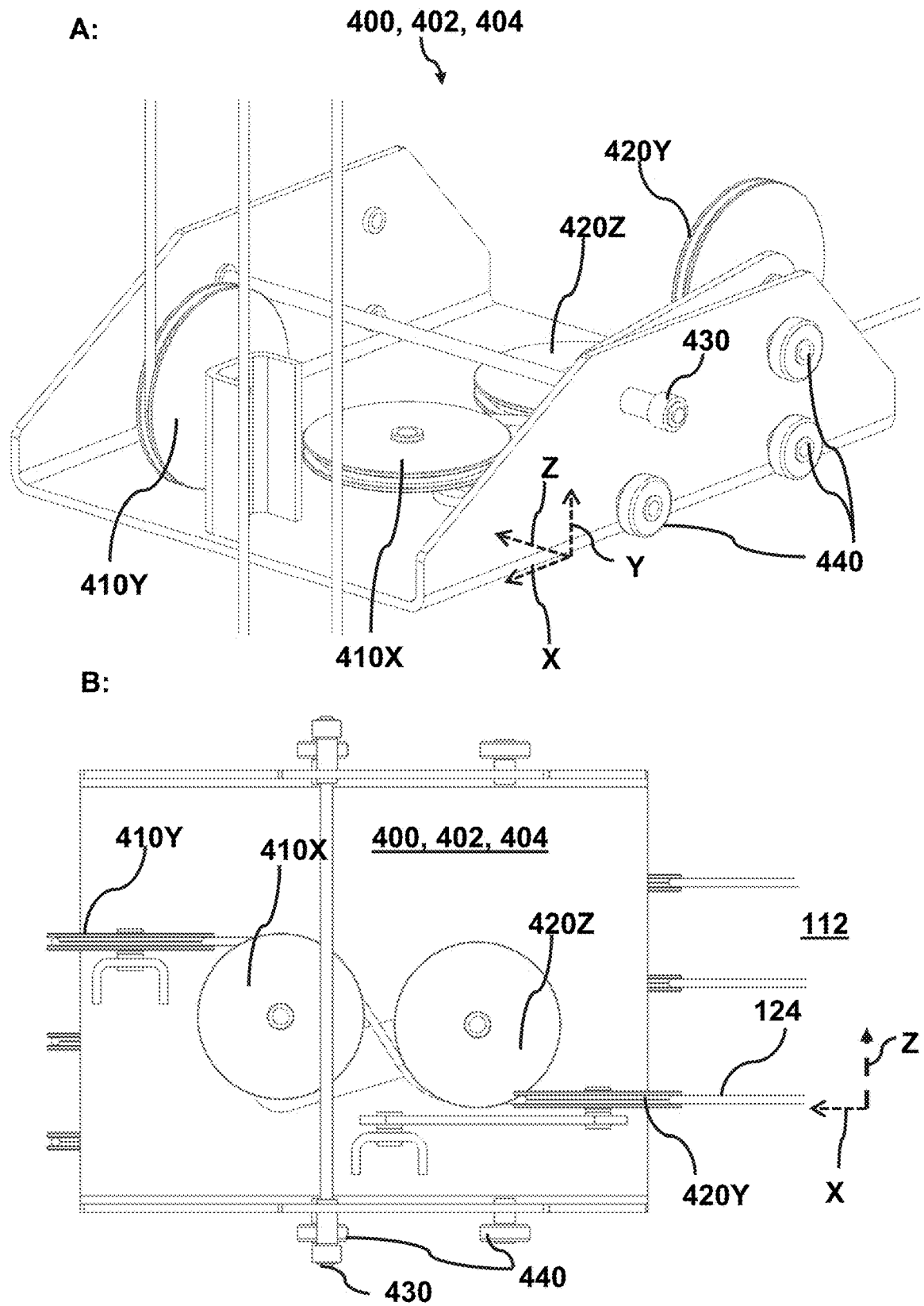
FIG. 8 illustrates a pulley block.

An embodiment of the pulley blocks 400 is described in greater detail in FIG. 8.

The cutter system 100 further comprises four cutter wires 124 extending in the portal 112, thereby defining a wire grid 122.

The extent of the four cutter wires 124 across the portal are defined by the relative position of the entry blocks 402 and exit blocks 404.

Figure 7:
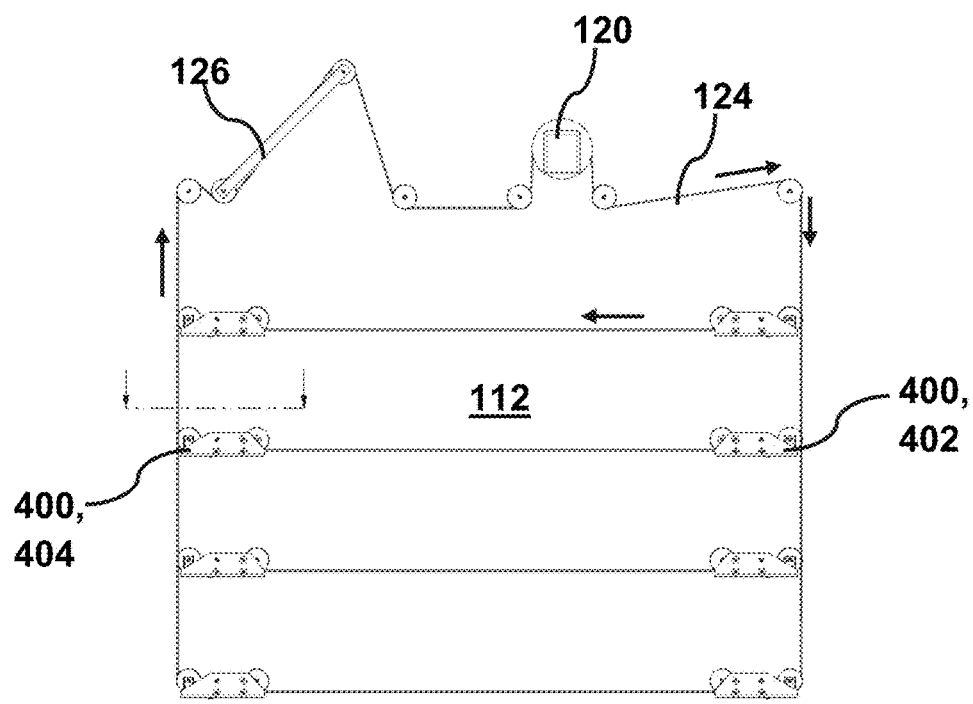
FIG. 7 illustrates a wire grid (A) and a wire grid with bottom support (B)
Figure 7:
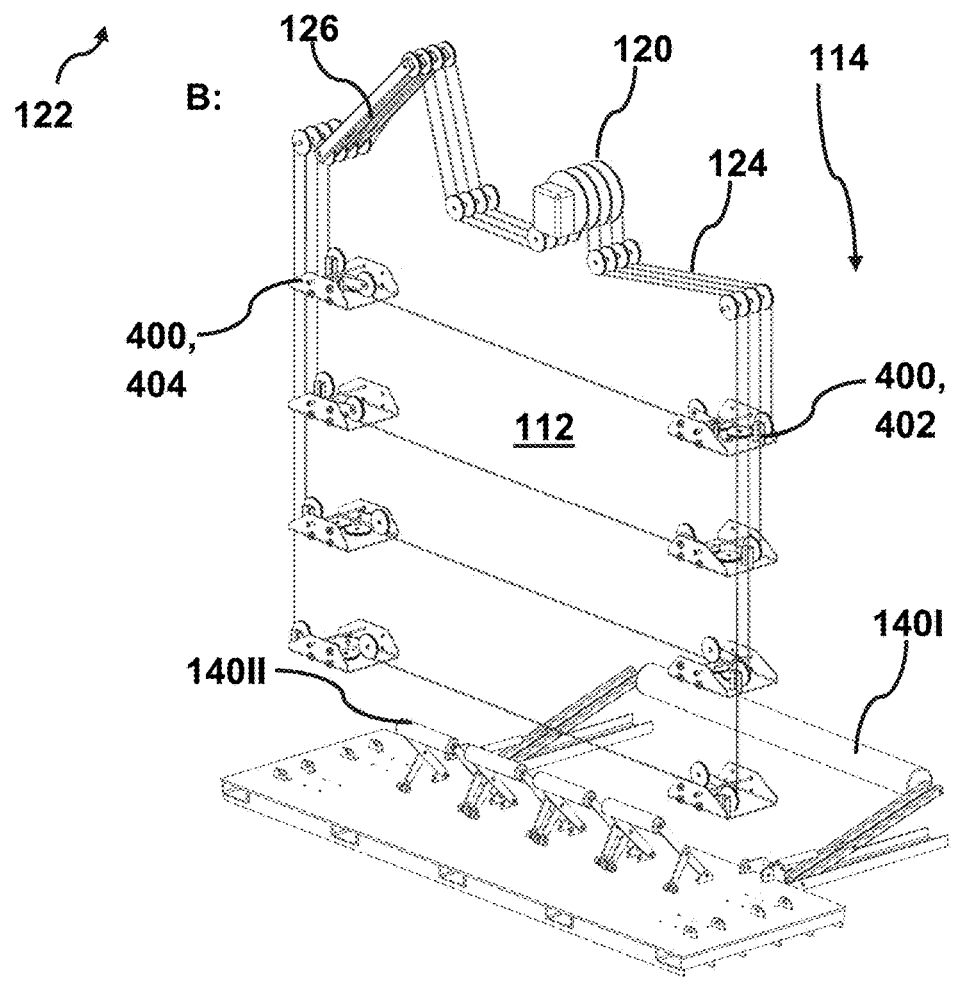

The gantry 110 comprises several pulleys defining a wire path of the cutter wires 124, this is disclosed in detail in FIG. 7.

The gantry 110 comprises a tension arm 126 for each cutter wire 124, the tension arms 126 being pivotally connected to a top bar 522II. The pivotal movement is shown with a bold double arrow. The tension arms 126 ensure that the cutter wires 126 have little to no slack. The angle of the tension arms 126 relative to the top bar 522II can be used to determine a strain on the individual cutter wires 124.

This will happen if the movement of a shell-type object 10 forces the cutter wires 124 to bend, as the cutter wire 124 is substantially inelastic and thus the length of cutter wires 124 does not change, the tension arms 126 must then pivot towards the top bar 522II to reduce tension.

The gantry 110 further comprises a wire drive 120. The wire drive 120 operates the wire cutters 126 simultaneously as a single group in the present embodiment, but the wire drive 120 can in other embodiments drive the cutter wires 126 individually, i.e. at individual speeds.

The drive 120 can be used to determine a strain on the wire cutters 126 by measuring a power consumption or speed of the drive.

The gantry 110 further comprises moving means 190 in the form of a pull system 300 for pulling an elongated shell-type object 10. The pull system 300 comprises a winch 310 on each side of the portal 112.

In this embodiment, each winch 310 is connected to one of the pillars 520I, 522II.

The pull system 300 comprises pull cables 320 to be connected by a not shown fastening system 200 to a distal point 14 of a shell-type object 10.

The winches 310 on each side of the portal 112 enable the cutter system 100 to correct the movement of the shell-type object 10 by only pulling one side or by pulling each cable with a different pull speed.

The position of the distal point 14 is a good indicator for estimating whether the shell-type object 10 is being pulled towards the gantry 110 in an intended manner.

Examples of a fastening system 200 will be presented in later figures.

The cutter system 100 further comprises two bottom supports 140I, 140II. Both bottom supports 140I, 140II are in this embodiment connected to the base plate 510, thus making the cutter system 100 more compact.

The primary bottom support 140I is positioned near the front side 114 of the gantry 110 for supporting the shell-type object 10 at a proximal point 12 relative to the gantry 110.

The primary bottom support 140I positioned near the front side 114 of the gantry 110 has a greater effect on the reliability of the cutter system 100 and on the speed of operation relative to the secondary bottom support 140II shown in the present figure. The difference in effect is due to the relative positioning of the primary and secondary bottom supports 140I, 140II.

The shell-type object 10 will never be cut on the part supported by the bottom support 140I, thus there will be no structural weaknesses introduced. Likewise, since the bottom support is positioned on the front side 114, there is little risk of the shell-type object 10 moving backwards of the portal 112 after being cut in a plane substantially parallel to the portal 112.

The primary bottom support 140I is displaceable along the vertical axis by a pair of actuators 142, thereby the bottom support 140I is capable of displacing the shell-type object 10 in the vertical direction.

The four cutter wires 124 are positioned with a mutual spacing along the vertical axis Y, the bottom support 140I is capable of displacing the bottom support 140I and thus the shell-type object 10 by at least the mutual spacing. Thereby, the bottom support 140I enables the cutter system 100 to cut the shell-type object 10 into shorter sections, which will increase S/G-ratio and the sections may be fed into a standard shredder.

The primary bottom support 140I is a roller 148 having a rotation axis substantially parallel to the horizontal axis X. The roller decreases friction and increases the speed of operation.

The roller 148 is connected by two arms to the base plate 510, wherein the actuators 142 are connected to the arms.

The secondary bottom support 140II is positioned at the portal 112 for supporting the shell-type object 10 at a proximal point 12 relative to the gantry 110. The bottom support 140II comprises several rollers 140 having a rotation axis substantially parallel to the horizontal axis X.

The gantry 110 comprises on both sides of the portal 112 side supports 145 adapted for adjusting the movement of a shell-type object 10 such that collision with the gantry 110 is prevented.

The side supports 145 may be rollers 148 having a rotation axis substantially parallel to the vertical axis Y, the rollers 148 will reduce friction with the shell-type object 10.

The cutter system 100 is further secured to the ground by several guy lines 170 connected to the gantry 110 and to the ground, this may be done using not shown ground screws 172.

The cutter system 100 further comprises a controller 160 operating the wire drive 120 and/or the pull system 300 and/or the primary bottom support 140I with the actuators 142.

The controller may operate as a function of the strain on the cutter wires 124.

Figure 5:
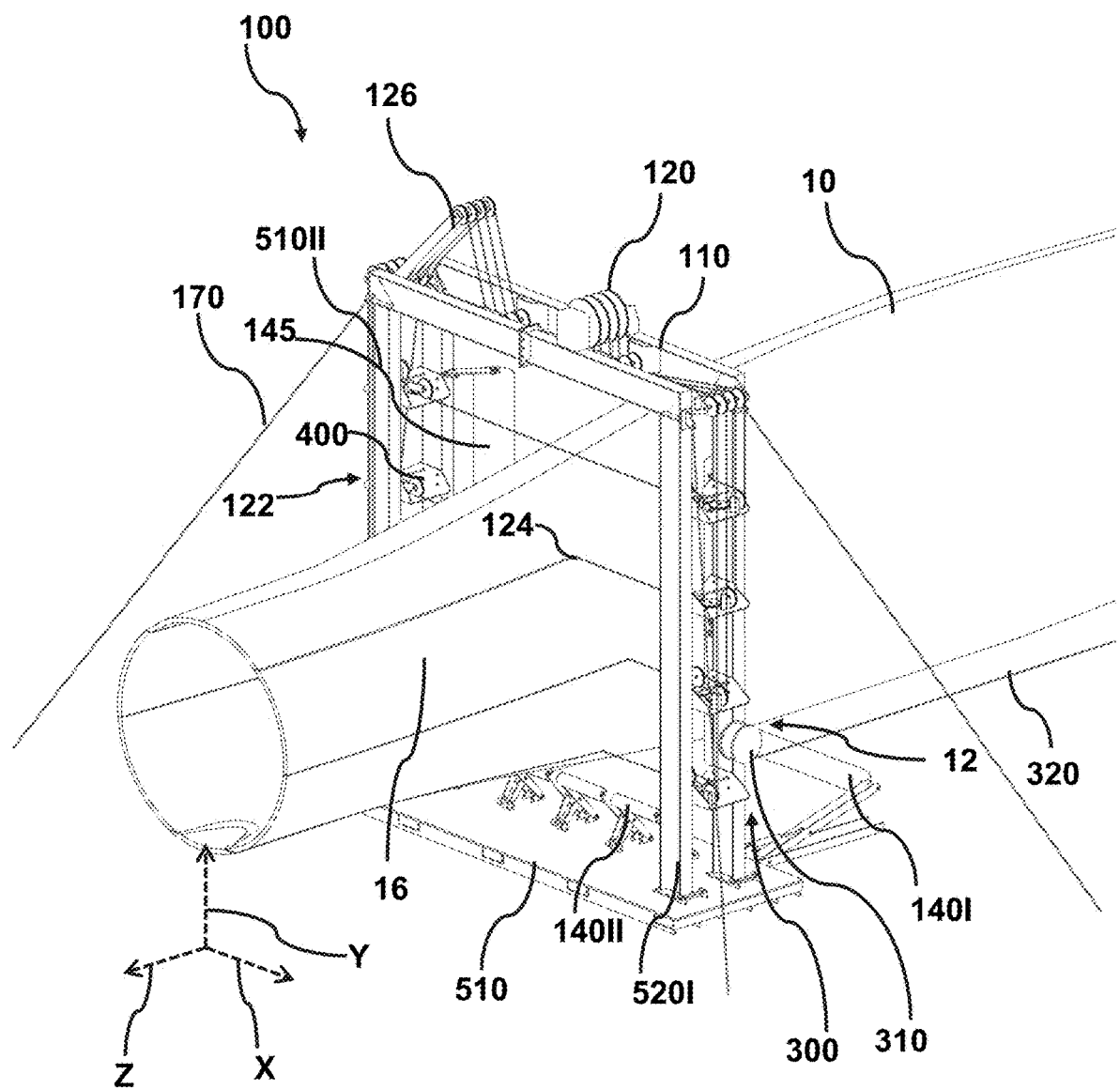
FIG. 5 illustrates a cutter system cutting an elongated shell-type object.

FIG. 5 illustrates a cutter system 100 cutting an elongated shell-type object 10. FIG. 5 is a continuation of FIG. 4 as a shell-type object 10 is being pulled along the lateral axis Z through the portal 112 whilst the wire grid 122 is operated.

The shell-type object 10 is supported at a proximal point relative to the gantry 110 by the primary bottom support 140I. Thereby stabilising the movement of the shell-type object 10.

Thereby, the shell-type object 10 is cut into elongated sections 16. If the primary bottom support 140I is not displaced, then the sections 16 will have a length equal to the length of the shell-type object 10.

In the present case, the shell-type object 10 is a wind turbine blade.

Figure 6:
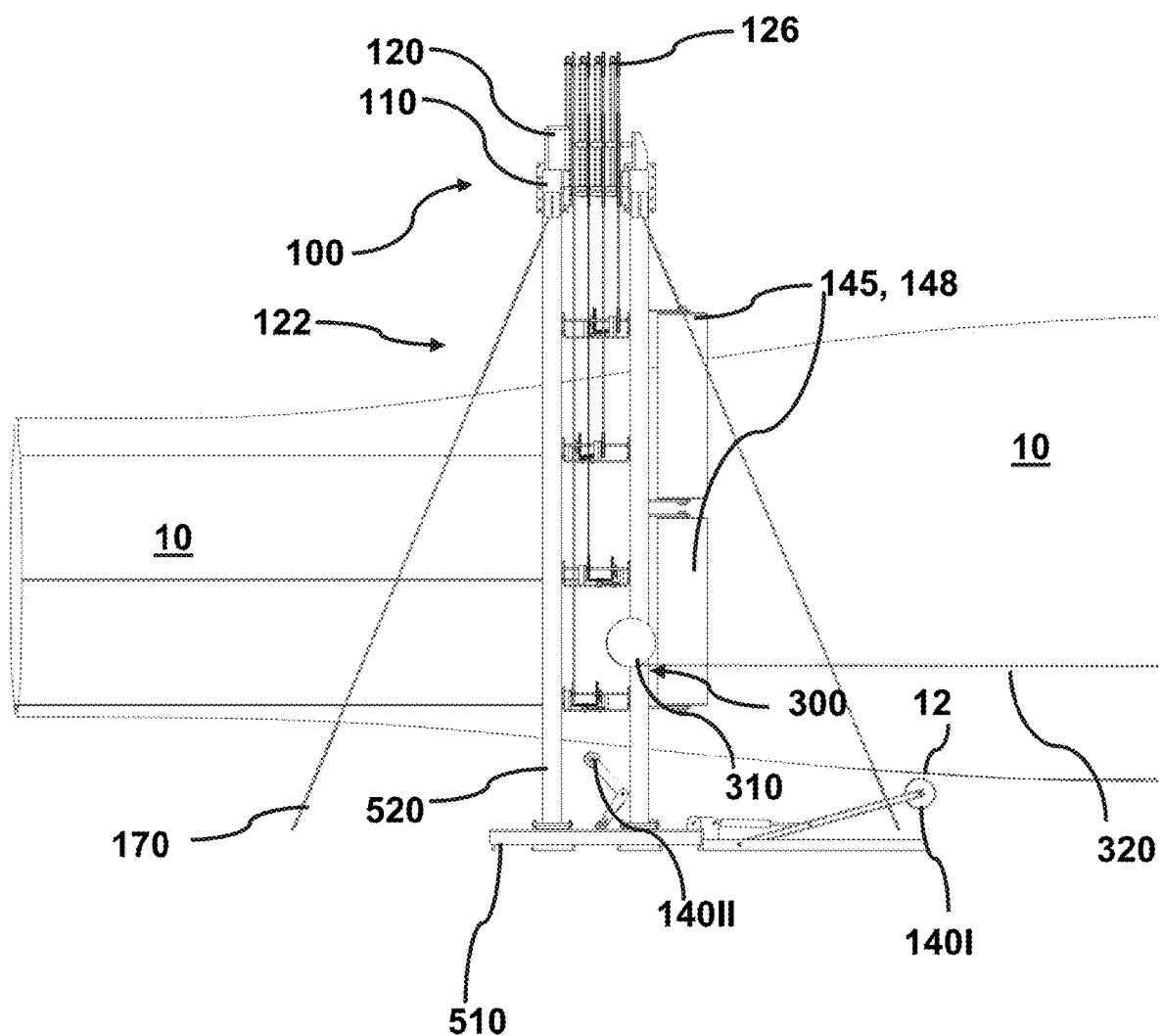
FIG. 6 illustrates a cutter system cutting an elongated shell-type object from a side view.

FIG. 6 illustrates a cutter system 100 cutting an elongated shell-type object 10 from a side view. FIG. 6 is FIG. 5 from a side view.

FIG. 7 illustrates a wire grid 122 (FIG. 7A) and the wire grid 122 with a bottom support 140 (FIG. 7B).

The wire grid 122 comprises four endless cutter wires 124 extending through and around a portal 112 defined by a not shown gantry 110.

The wire grid 124 is operated by a wire drive 120, which drives the cutter wires 124 clockwise as indicated by the bold straight arrows.

The slack of the cutter wires 124 are controlled by pivotal tension arms 126 creating a constant tension.

The cutter wires 124 extend across the portal 112 in a direction defined by pulley blocks 400, where the pulley blocks 400 on one side are entry blocks 402 and on the other side are exit blocks 404 forming pulley block pairs.

FIG. 8 illustrates a pulley block 400 in perspective view (FIG. 8A) and a top view (FIG. 8B). The pulley block 400 can be an entry block 402 or an exit block 404. FIG. 8 discloses part of the portal 112.

FIG. 8 discloses a lateral axis Z, a vertical axis Y and a horizontal axis X. The pulley block 400 is designed to withstand a force from a shell-type object 10 moving through the wire grid 122 along the lateral axis Z as will become apparent.

The pulley block 400 comprises four pulleys; two direction pulleys 410X, 410Y and two force pulleys 420Y, 420Z.

The purpose of the force pulley 420Y is to ensure that when the shell-type object is displaced along the vertical axis Y, then the force acted on the cutter wire 124 in the vertical direction is counteracted by the force pulley 420Y.

The purpose of the force pulley 420Z is to ensure that when the shell-type object is moved along the lateral axis Z, the force acted on the cutter wire 124 in the lateral direction is counteracted by the force pulley 420Y.

The purpose of the direction pulley 420X is to ensure that the cutter wire 124 extends substantially parallel to the horizontal axis X.

The purpose of the direction pulley 420Y is to ensure that the cutter wire 124 extends substantially parallel to the vertical axis Y.

The pulley block 400 has sides equipped with guide wheels 440 and a pinion 430 which enables the pulley block 400 to be displaced along the gantry 110 along the vertical direction Y.

Figure 9:
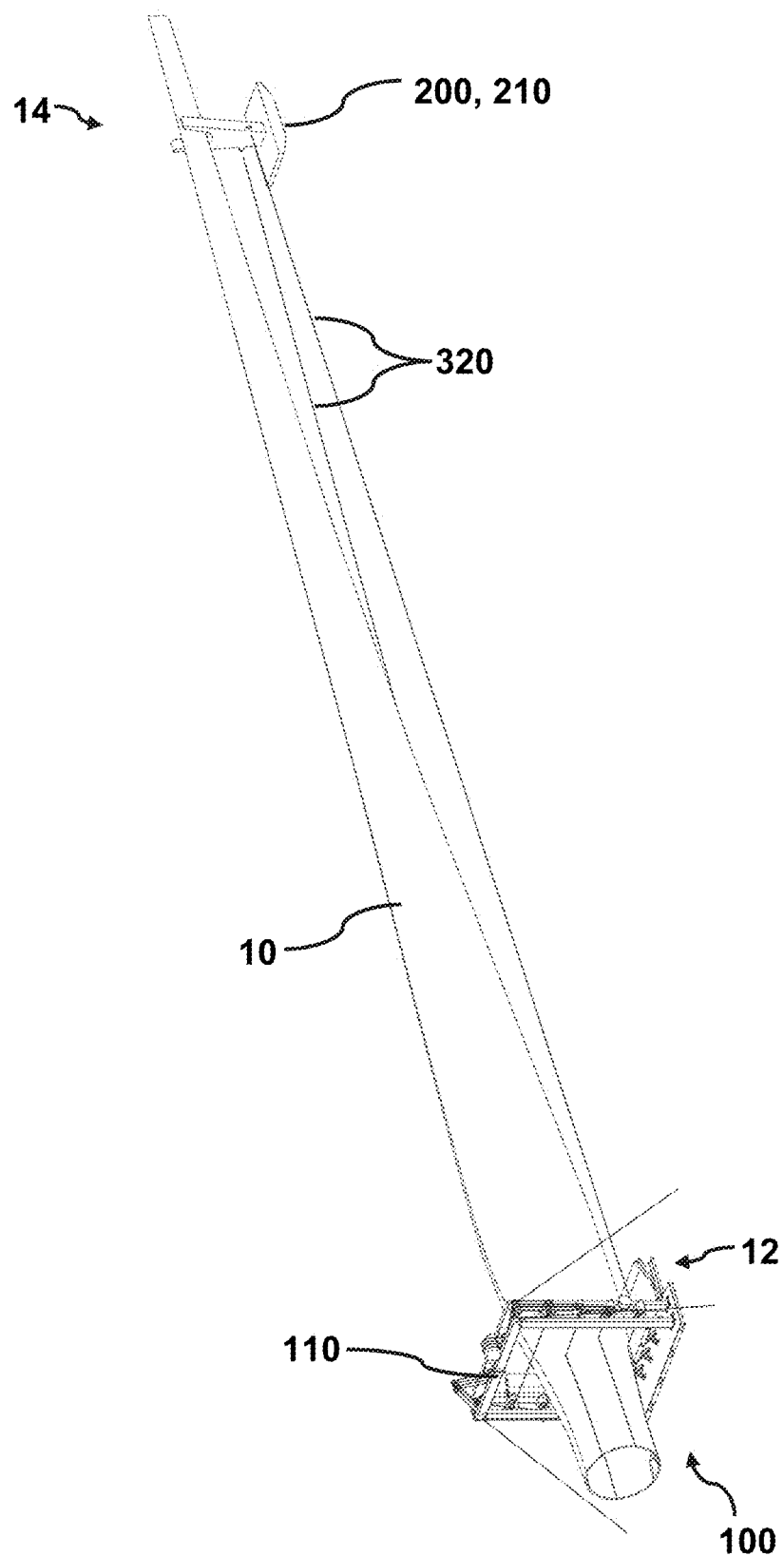
FIG. 9 illustrates a cutter system with a sled cutting a wing turbine blade.

FIG. 9 illustrates a cutter system 100 with a sled 210 cutting a wind turbine blade being an elongated shell-type object 10. The wind turbine blade can be 80 m long.

FIGS. 5-6 are close-ups of the cutter system 100 cutting the shell-type object 10.

The sled 210 functions as a fastening system 200 supporting the shell-type object 10 at a distal point 14 relative to the gantry 110.

The shell-type object 100 is further supported at a proximal point 12 relative to the gantry 110.

The gantry 110 is connected to the sled 210 by two cables 310.

Figure 10:
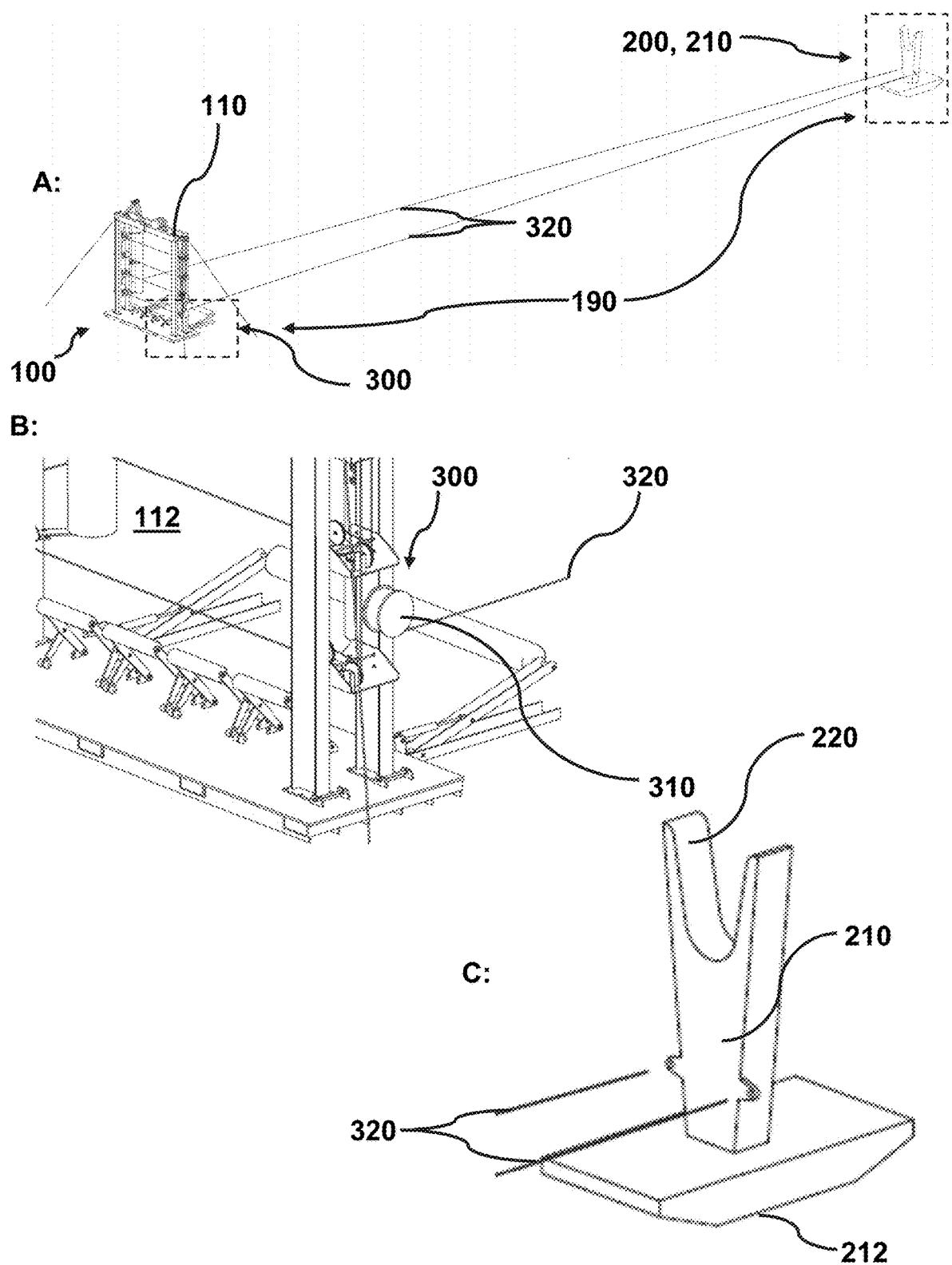
FIG. 10 illustrates moving means.

FIG. 10 illustrates moving means 190. The moving means 190 comprises a pull system 300 and a fastening system 200 in the form of a sled 210.

The pull system 300 is disclosed in FIG. 10B and the sled 210 is disclosed in FIG. 10C.

The pull system 300 comprises two winches 310 on each side of a portal 112 defined by the gantry 110, but only one of the winches is disclosed in FIG. 10B.

The winches 310 are adapted for pulling the two cables 320 connected to the sled 210.

The sled 210 in FIG. 10C comprises a sled base 212 and a sled support 220 extending from the sled base 212. The sled support 220 having a central support valley adapted for supporting a shell-type object 10.

Figure 11:
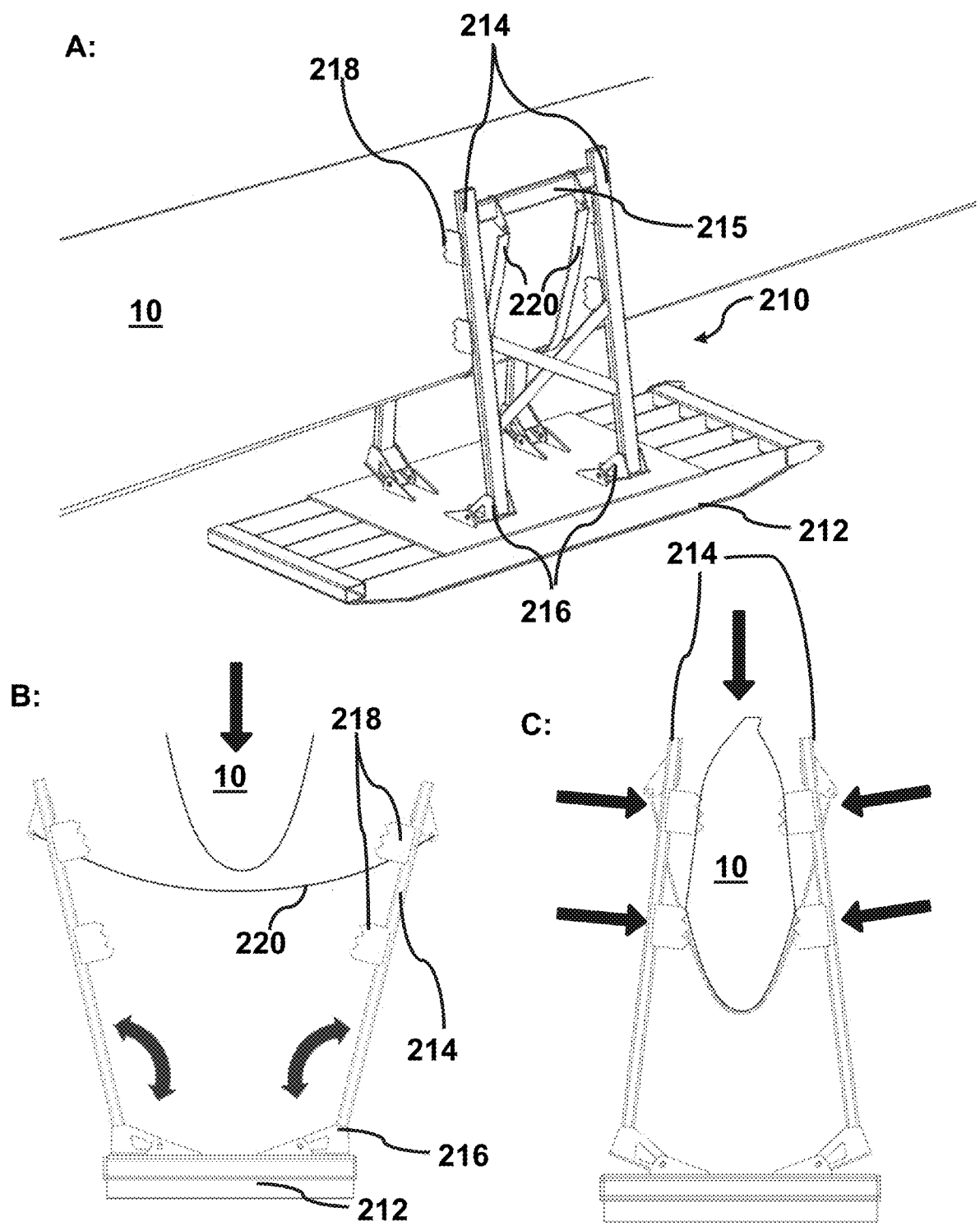
FIG. 11 illustrates an embodiment of a sled.

FIG. 11 illustrates an embodiment of a sled 210.

The sled 210 comprises a sled base 212, two pairs of sled arms 214 pivotally connected to the sled base 212. Each pair of sled arms 214 is interconnected by a sled bar 215 extending between the sled arms 214, wherein two sled supports 220 extend between the two sled bars 215. The sled supports 220 are flexible supports such as softslings.

The sled arms 214 are equipped with a plurality of sled jaws 218. The sled jaws 218 are adapted for increasing the friction between the sled 210 and the shell-type object 10. The friction can be increased by choosing a suitable material which has a high friction coefficient with the material of the shell-type object.

The sled jaws 218 are saw-toothed to increase friction even further.

The pivotal arms 214 will when a shell-type object 10 is positioned and supported by the sled support 220 pivot towards each other thereby gripping the shell-type object 10 with the sled jaws 218 as shown in FIG. 11A-C.

Figure 12:
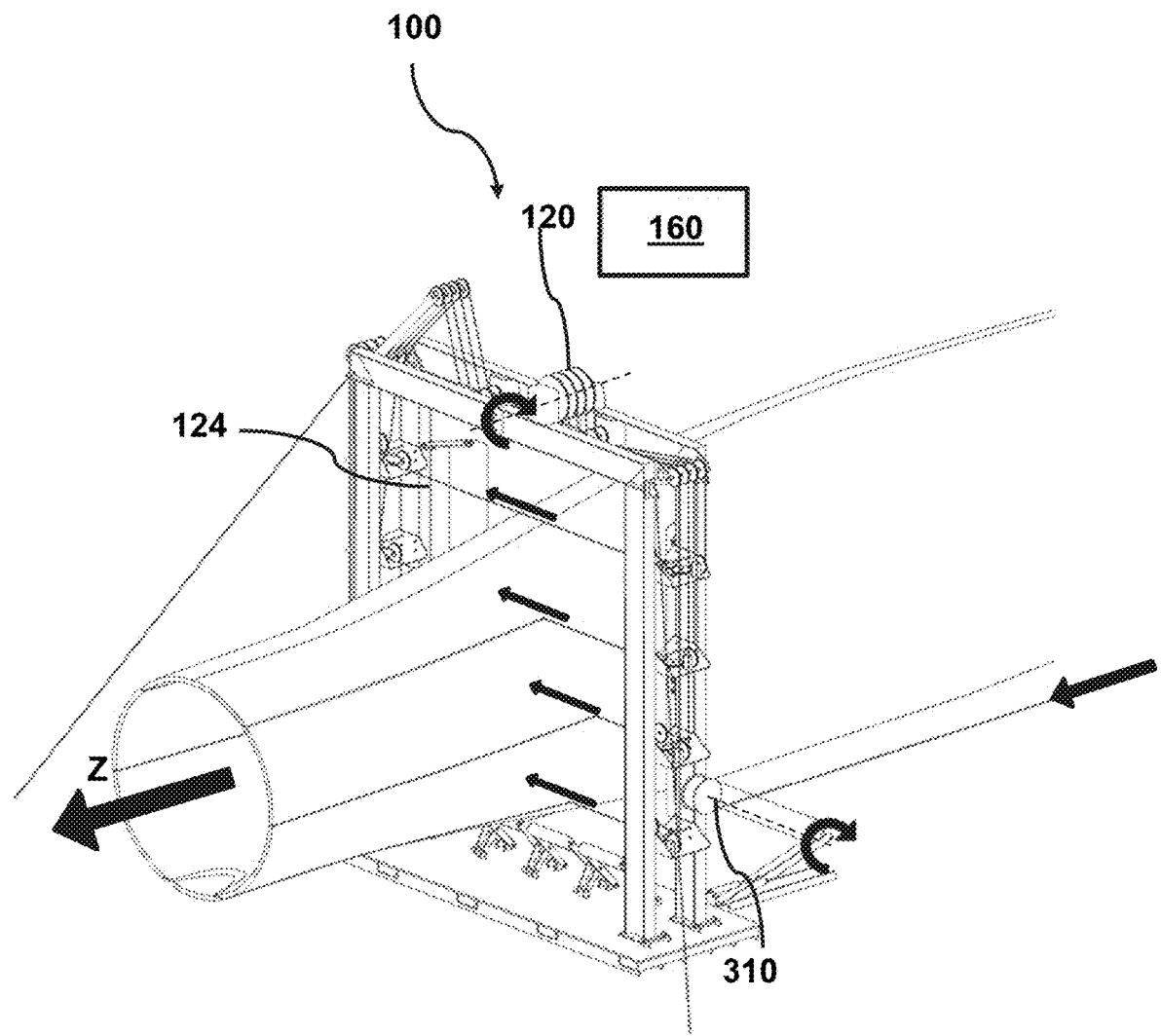
FIG. 12 illustrates a cutter system with a controller controlling the cutting along the lateral-axis.

FIG. 12 illustrates a cutter system 100 with a controller 160 controlling the cutting along the lateral-axis Z. The system 100 is shown in FIG. 5. The controller controls the pulling force acted by the winches 310 and the speed of the wire drive 120.

This may be done as function of the strain of the cutter wires 124 as previously described.

Figure 13:
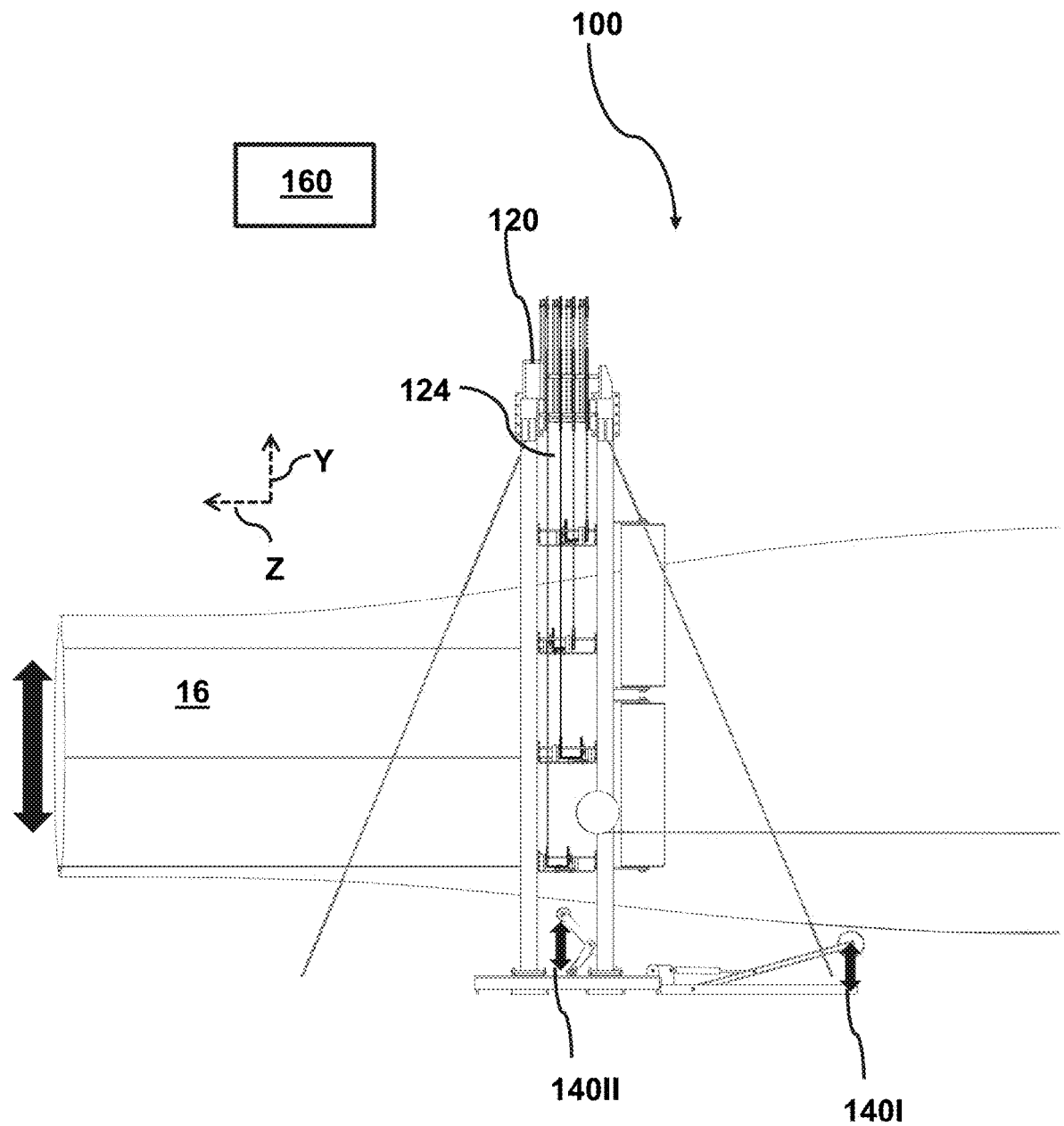
FIG. 13 illustrates a cutter system with a controller controlling the cutting along the vertical-axis

FIG. 13 illustrates a cutter system 100 with a controller 160 controlling the cutting along the vertical axis Y.

The controller 160 controls the displacement of a primary bottom support 140I and/or the secondary bottom support 140II and the speed of the wire drive 120.

The displacement enable the cutter system 100 to cut the shell-type object 10 into shorter sections 16 along the lateral axis, since the displacement will cause the cutter wires 124 to cut the shell-type object 10 along the vertical axis Y.

Figure 14:
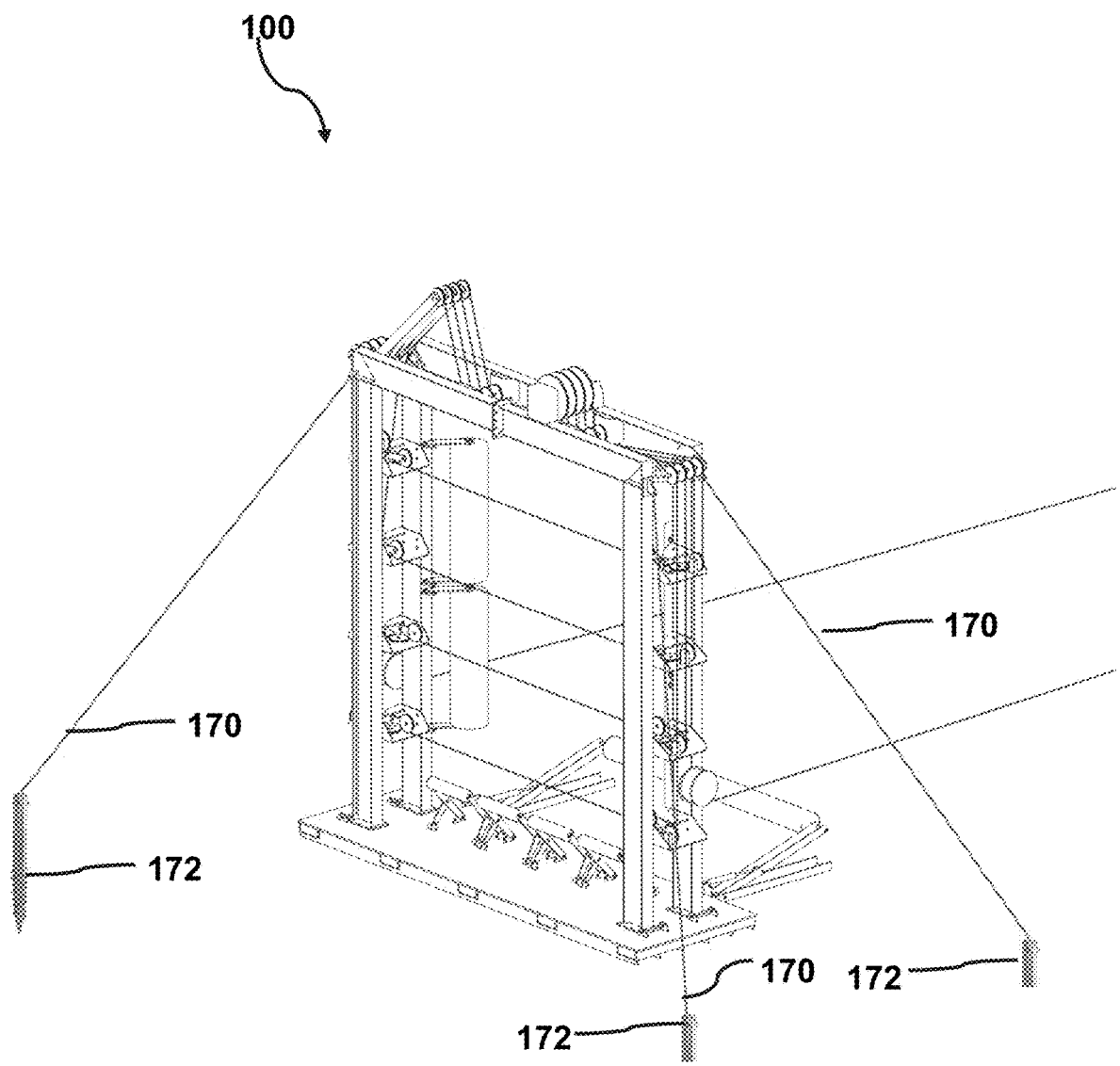
FIG. 14 illustrates a cutter system secured to the ground with guy lines and ground screws.

FIG. 14 illustrates a cutter system 100 secured to the ground with guy lines 170 and ground screws 172.

Figure 15:
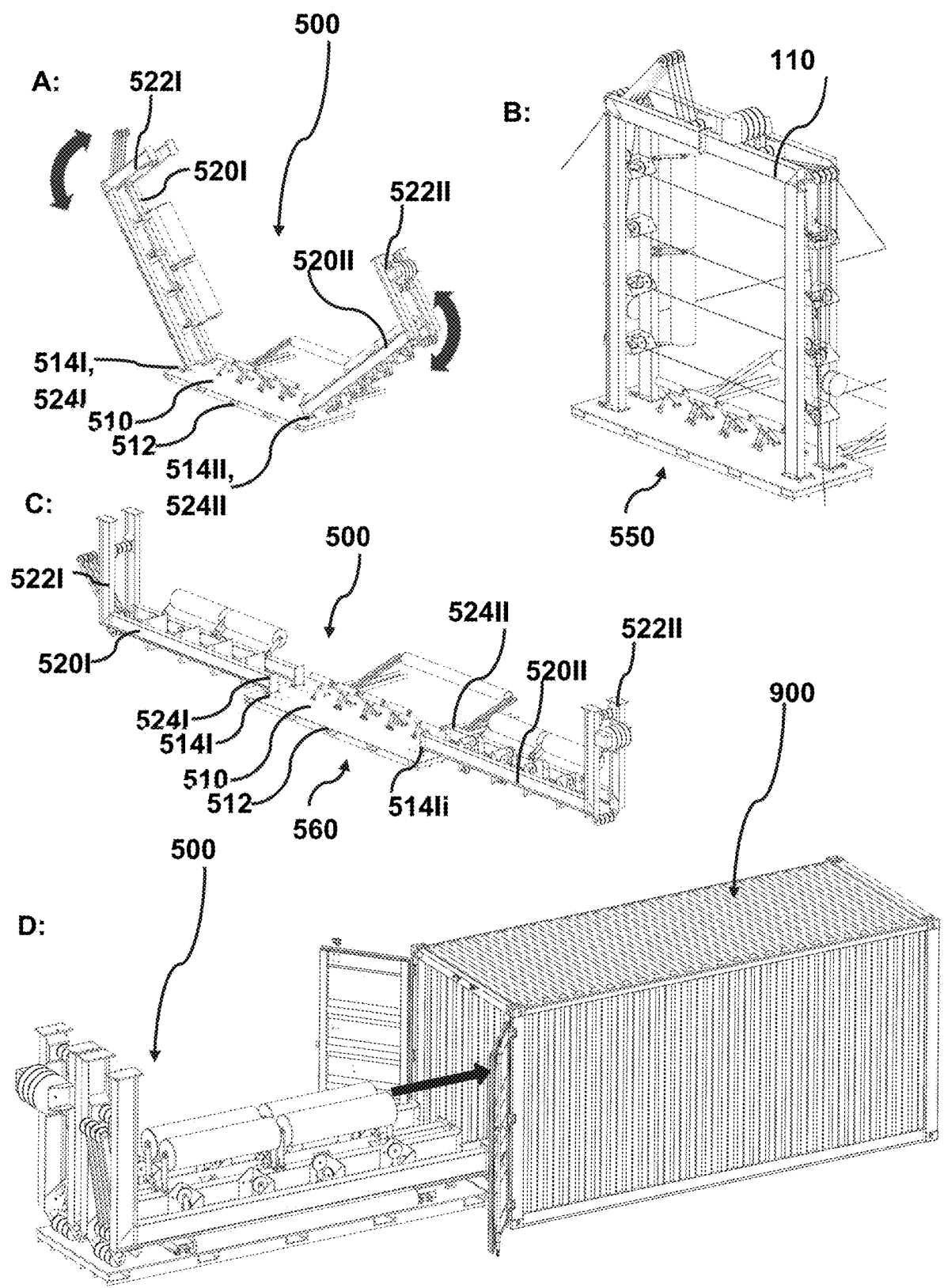
FIG. 15 illustrates an assembly kit.

FIG. 15 illustrates an assembly kit 50 and how the assembly kit 500 is assembled and transported in a container 900.

The assembly kit 500 comprises a bottom plate 510 with hinges 514 and forklift pockets 512 for being moveable by a forklift.

The assembly kit 500 comprises two pillars 520, wherein each pillar 520 has an extending top bar 522, thereby defining an L-shape. The top bar 522 is configured for engaging the top bar 522 of the other pillar 520.

Each pillar 520 having opposite to the top bar 522 a bottom base 524 configured for engaging the hinges 514, thereby enabling each pillar 520 to be pivotable between a horizontal position 560 and a vertical position 550 where the top bars 522 engage.

Figure 16:
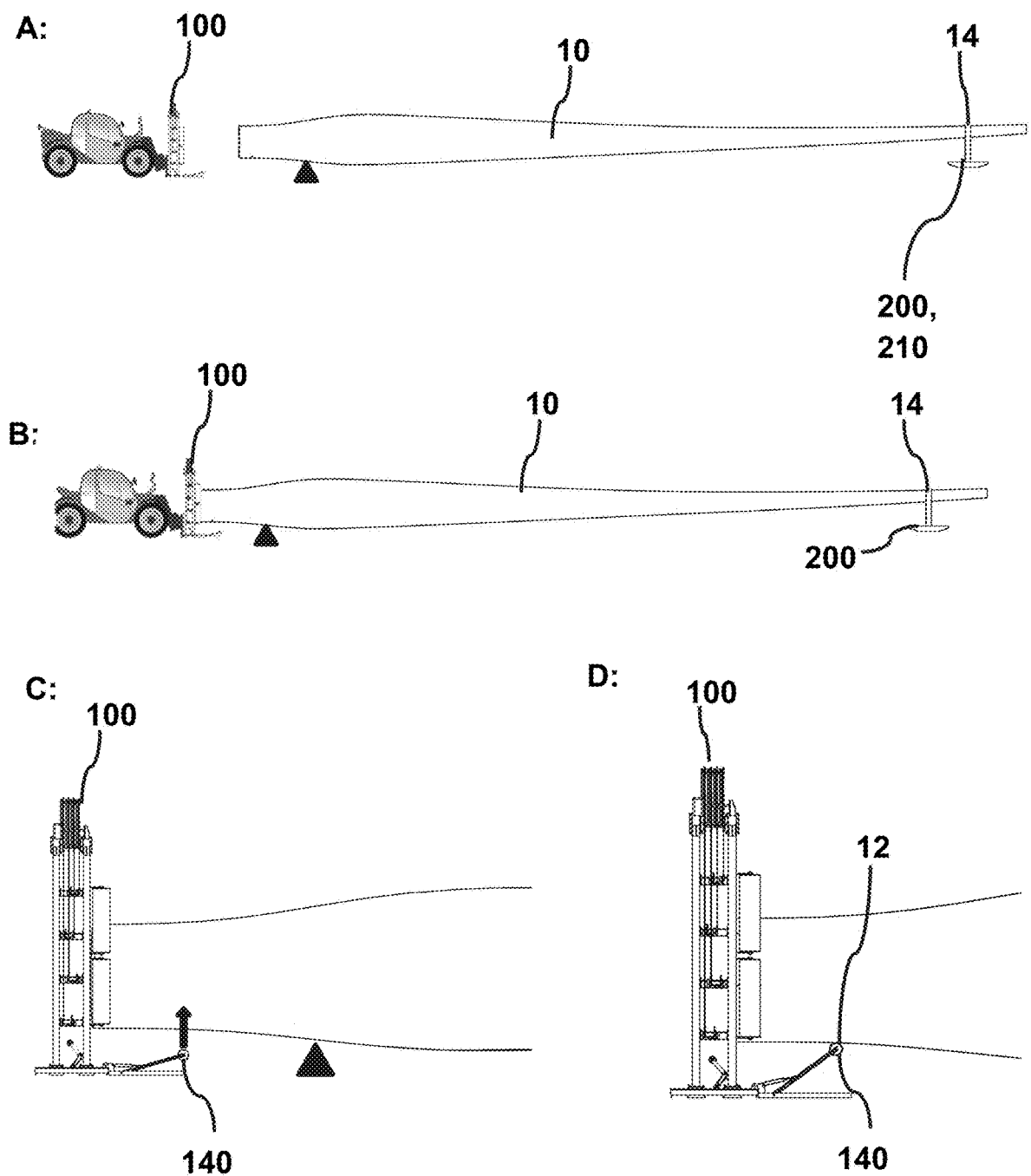
FIG. 16 illustrates the placement of the cutter system using a forklift.

FIG. 16 illustrates the placement of the cutter system 100 using a forklift at one end of a shell-type object 10. This is shown in FIGS. 16A to 16D, wherein FIG. 16D discloses how the bottom support 140 engages the shell-type object 10 at a proximal point 12 thereby replacing a temporary support shown as a bold triangle.

A fastening system 200 in the form of a sled 210 already supports the shell-type object 10. The sled 210 is simple and cheap relative to the gantry 110 and thus the sled can be sent in advance and in larger numbers such as three sleds 210 to three wind turbine blades, while the same gantry 210 is used to cut all tree blades.

Figure 17:
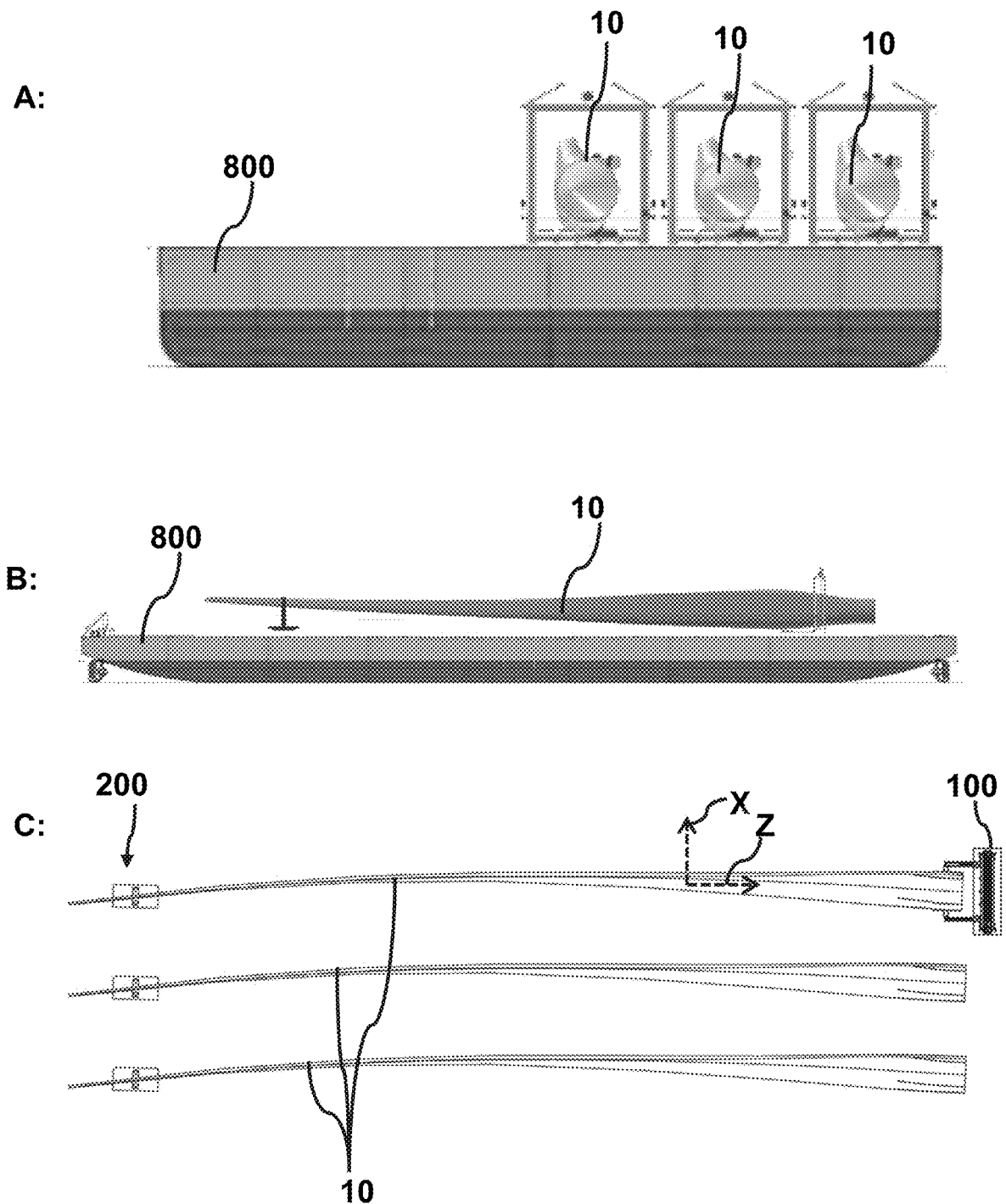
FIG. 17 illustrates an offshore vessel having multiple shell-type objects and a cutter system.

FIG. 17 illustrates an offshore vessel 800 having multiple shell-type objects 10 and a cutter system 100.

The offshore vessel 800 with the cutter system 100 can be used to decommission off-shore wind turbine generators.

The offshore vessel 800 having three fastening systems 200 each of the multiple shell-type objects 10 and a single cutter system 100 is used for cutting the multiple shell-type objects 10 into sections 16.

The offshore vessel 800 may further comprise a shredder for shredding the sections 16.

The invention claimed is:

1. A method for cutting an elongated shell-type object being a wind turbine blade, an aero-plane hull, a vessel hull, glass fiber reinforced container, a tank, a vessel, or a pipe, the method comprises the following steps:

providing a gantry that defines a portal, the gantry including a wire grid operable in the portal, the wire grid comprises several cutter wires and the step of providing the gantry includes attaching a sled comprising a sled support to the shell-type object at a distal point relative to the gantry and a pull system having one or more cables extending between the sled and the gantry;

operating the wire grid; whilst moving the shell-type object through the wire grid along a lateral-axis substantially perpendicular to the portal by pulling the sled towards the gantry by pulling the one or more cables as a function of the position of the distal point of the shell-type object; and determining a strain on the wire grid to prevent breakage of the several cutter wires, wherein the step of pulling the sled and the shell-type object is performed as a function of the strain.

2. The method according to claim 1, wherein the step of providing the gantry includes providing a bottom support supporting the shell-type object at a proximal point relative to the gantry;

the step of moving the shell-type object includes a step of displacing the shell-type object along a vertical-axis by displacing the bottom support.

3. The method according to claim 1, wherein the step of providing a gantry includes providing the gantry as an assembly kit in a container and the step of providing the gantry includes assembling the gantry.

4. Method for cutting multiple elongated shell-type objects aligned side by side and in parallel, wherein the method includes the following step of
cutting one shell-type object according to claim 1;
translocating the gantry along a horizontal axis perpendicular to the multiple shell-type objects; and
repeating the step of cutting and translocating one or more of the other shell-type objects.

5. A cutter system for cutting an elongated shell-type object such as a wind turbine blade, the cutter system comprising means for performing the method according to claim 1.

6. An offshore vessel equipped with a cutter system according to claim 5.

7. A method for cutting an elongated shell-type object being a wind turbine blade, an aero-plane hull, a vessel hull, glass fiber reinforced container, a tank, a vessel, or a pipe, the method comprises the following steps:
providing a gantry that defines a portal, the gantry including a wire grid operable in the portal, the wire grid comprises several cutter wires and the step of providing the gantry includes attaching a sled comprising a sled support to the shell-type object at a distal point relative to the gantry and a pull system having one or more cables extending between the sled and the gantry;
operating the wire grid; whilst
moving the shell-type object through the wire grid along a lateral-axis substantially perpendicular to the portal by pulling the sled towards the gantry by pulling the one or more cables as a function of the position of the distal point of the shell-type object; and
determining a strain on the several cutter wires, wherein the step of operating the wire grid is performed as a function of the strain to prevent breakage of the several cutter wires.

8. A cutter system configured for cutting an elongated shell-type object being a wind turbine blade, an aero-plane hull, a vessel hull, glass fiber reinforced container, a tank, a vessel, or a pipe, the cutter system comprising:
a gantry defining a portal, the gantry having a front side configured and arranged for facing the elongated shell-type object,
several cutter wires extending in the portal, thereby defining a wire grid,
a wire drive configured for driving the one or more cutter wires,
a sled comprising a sled support configured for supporting the shell-type object and for moving the shell-type object through the portal; and
a pull system having one or more cables extending between the sled and the gantry;
a controller, wherein the moving means is configured and arranged to be operated by the controller, and the controller is configured to determine a strain on the cutter wires and to pull the sled towards the gantry as a function of the strain to prevent breakage of the several cutter wires.

9. The cutter system according to claim 8, the cutter system further including
a bottom support positioned at the portal and/or near the front side of the gantry, the bottom support configured and arranged for supporting the shell-type object at a proximal point relative to the gantry, and is displaceable along a vertical-axis.

10. The cutter system of claim 8, wherein the moving means includes
a fastening system for attaching to the shell-type object at a distal point relative to the gantry; and
a pull system having one or more pull cables connected to the fastening system.

11. The cutter system according to claim 8, further including an assembly kit having
a bottom plate with hinges;
two pillars, wherein each pillar having an extending top bar, thereby defining an L-shape, the extending top bar of a first pillar of the two pillars is configured for engaging the extending top bar of a second pillar of the two pillars; each pillar having, opposite to the top bar, a bottom base configured for engaging the hinges, thereby enabling each pillar to be pivotable between a horizontal position and a vertical position where the top bars engage,
the assembly kit configured to be assembled into the gantry.

12. The cutter system according to claim 11, wherein the assembly kit is configured and arranged to be packed in a container.

* * * * *